(12) United States Patent
Beitz

(10) Patent No.: US 11,815,641 B2
(45) Date of Patent: Nov. 14, 2023

(54) COMPOSITE FAR OFFSET IMPULSIVE SOURCE ACTIVATIONS FOR MARINE SEISMIC SURVEYING AND PROCESSING

(71) Applicant: PGS Geophysical AS, Oslo (NO)

(72) Inventor: Manuel Beitz, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 97 days.

(21) Appl. No.: 17/523,284

(22) Filed: Nov. 10, 2021

(65) Prior Publication Data
US 2022/0179116 A1 Jun. 9, 2022

Related U.S. Application Data

(60) Provisional application No. 63/121,464, filed on Dec. 4, 2020.

(51) Int. Cl.
*G01V 1/38* (2006.01)
*G01V 1/24* (2006.01)

(52) U.S. Cl.
CPC .............. *G01V 1/3861* (2013.01); *G01V 1/24* (2013.01); *G01V 1/3843* (2013.01)

(58) Field of Classification Search
CPC ...... G01V 1/3861; G01V 1/24; G01V 1/3843; G01V 1/3808; G01V 1/38
See application file for complete search history.

(56) References Cited

U.S. PATENT DOCUMENTS

| 5,430,689 A | 7/1995 | Rigsby et al. |
| 6,681,887 B1 | 1/2004 | Kragh et al. |
| 8,295,124 B2 | 10/2012 | Abma |
| 8,416,640 B2 | 4/2013 | Fleure et al. |
| 8,437,998 B2 | 5/2013 | Routh et al. |
| 8,848,483 B2 | 9/2014 | Mandroux et al. |
| 8,964,502 B2 | 2/2015 | Norris |

(Continued)

FOREIGN PATENT DOCUMENTS

WO 2019246297 12/2019

OTHER PUBLICATIONS

Xu, et al., "Radon-domain interferometric interpolation for reconstruction of the near-offset gap in marine seismic data," Journal of Applied Geophysics 151, pp. 125-141 (Elsevier 2018).

(Continued)

*Primary Examiner* — Ian J Lobo

(57) ABSTRACT

Techniques are described for utilizing far offset impulsive source activations in various contexts, including when performing marine seismic surveys, when manufacturing a geophysical data product in conjunction with such surveys, or when generating an image of geological features of a subsurface. According to some embodiments, near offset impulsive source activations are caused in a body of water at each of a plurality of near offset shot points, and composite far offset impulsive source activations are caused in the body of water at each of a plurality of far offset shot points. Each of the composite far offset impulsive source activations comprises a succession of component impulsive source activations occurring over a far offset shot length. The far offset shot length is short enough to satisfy a stationary source assumption for frequencies at or below a maximum frequency of interest for the far offset shot points.

27 Claims, 18 Drawing Sheets

(56) References Cited

U.S. PATENT DOCUMENTS

| | | |
|---|---|---|
| 9,134,442 B2 | 9/2015 | Dellinger et al. |
| 9,341,726 B2 | 5/2016 | Kostov et al. |
| 9,702,993 B2 | 7/2017 | Wang et al. |
| 9,772,412 B2 * | 9/2017 | Mahmoud .............. G01V 1/003 |
| 9,851,463 B2 * | 12/2017 | Baardman .............. G01V 1/364 |
| 9,921,328 B2 | 3/2018 | Teyssandier et al. |
| 10,126,451 B2 | 11/2018 | Anderson et al. |
| 10,386,511 B2 | 8/2019 | Routh et al. |
| 10,871,588 B2 | 12/2020 | Beitz et al. |
| 2012/0147699 A1 | 6/2012 | Dellinger et al. |
| 2014/0198611 A1 | 7/2014 | Siliqi |
| 2017/0160415 A1 | 6/2017 | Winnett et al. |
| 2018/0164457 A1 * | 6/2018 | Beitz .................... G01V 1/3808 |
| 2020/0116885 A1 | 4/2020 | Abma et al. |
| 2020/0393590 A1 | 12/2020 | Tenghamn |
| 2020/0400846 A1 | 12/2020 | Andersson et al. |

OTHER PUBLICATIONS

Xue, et al., "Amplitude-preserving iterative deblending of simultaneous source seismic data using high-order Radon transform," Journal of Applied Geophysics 139, pp. 79-90 (Elsevier 2017).
Search Report in GB2117339.8, dated May 5, 2022, 3 pages.

* cited by examiner

| Near Offset Vessel ◁ | Speed 1 ☆ | Speed 1 ☆ | Speed 1 ☆ | Speed 1 ☆ | Speed 1 ☆ | ☆ |
|---|---|---|---|---|---|---|
| Far Offset Vessel ◁ | Speed 3 ◇◇◇◇ | Speed 2 | Speed 3 ◇◇◇◇ | Speed 2 | Speed 3 ◇◇◇◇ | |

FIG. 26

COMPOSITE FAR OFFSET IMPULSIVE SOURCE ACTIVATIONS FOR MARINE SEISMIC SURVEYING AND PROCESSING

CROSS-REFERENCE TO RELATED APPLICATIONS

This application claims benefit to the filing date of U.S. Provisional Application 63/121,464, filed Dec. 4, 2020, the contents of which are hereby incorporated by reference as if entirely set forth herein.

BACKGROUND

Marine seismic surveys are performed in bodies of water for a variety of purposes. Often their purpose is to determine attributes of structures or materials disposed in earth volumes that lie beneath the bodies of water.

One common type of marine seismic survey is a towed streamer survey. In a towed streamer survey, a vessel tows one or more elongate cables, usually called streamers, in a pattern over a subsurface area of interest. Each of the streamers may include an array of geophysical sensors disposed at intervals along the length of the streamer such that the streamers form a sensor array. One or more seismic sources (typically air guns) are activated as the streamers are towed in the body of water. Acoustic energy generated by the source activations penetrates into underlying earth layers and ultimately is reflected back upward to the sensors. Recording equipment, usually aboard the towing vessel, records signals generated by the sensors in response to the reflected energy. Seismic data processing and imaging techniques are then applied to the recorded signals to produce images of the subsurface structures that produced the reflections.

Another common type of marine seismic survey is a node survey. In a node survey, the geophysical sensors are disposed on or in a set of nodes that are deployed at various locations on the water bottom. In yet another type of marine seismic survey, the ocean bottom cable survey, geophysical sensors may be contained in sensor cables that are disposed on the water bottom. Node surveys and ocean bottom cable surveys may employ the same or similar types of vessels and sources as are employed in towed streamer surveys.

In still other types of marine seismic surveys, a combination of nodes, ocean bottom cables or towed streamers may be employed simultaneously.

It is desirable that the environmental impact of performing any of the above types of marine seismic surveys should be minimized. It is also desirable that the images produced from data that are acquired during such surveys should be accurate, and that the data processing and imaging techniques applied to the data should be efficient and cost effective.

BRIEF DESCRIPTION OF THE DRAWINGS

These and other objectives may be achieved using techniques to be described below in relation to the following drawings.

FIG. 26 is a schematic view illustrating a technique in which a far offset source vessel sails at a first speed when in between far offset shot points and at a second speed when causing component far offset source activations, according to embodiments.

DETAILED DESCRIPTION

This disclosure describes multiple embodiments by way of example and illustration. It is intended that characteristics and features of all described embodiments may be combined in any manner consistent with the teachings, suggestions, and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others. The phrase "configured to" as used herein means that the referenced item, when operated, can perform the described function. In this sense an item can be "configured to" perform a function even when the item is not operating and therefore is not currently performing the function. Use of the phrase "configured to" herein does not necessarily mean that the described item has been modified in some way relative to a previous state. "Coupled" as used herein refers to a connection between items. Such a connection can be direct, or can be indirect, such as through connections with other intermediate items. Terms used herein such as "including," "comprising," and their variants, mean "including but not limited to." Articles of speech such as "a," "an," and "the" as used herein are intended to serve as singular as well as plural references except where the context clearly indicates otherwise.

Marine Seismic Surveying

Figure 1:
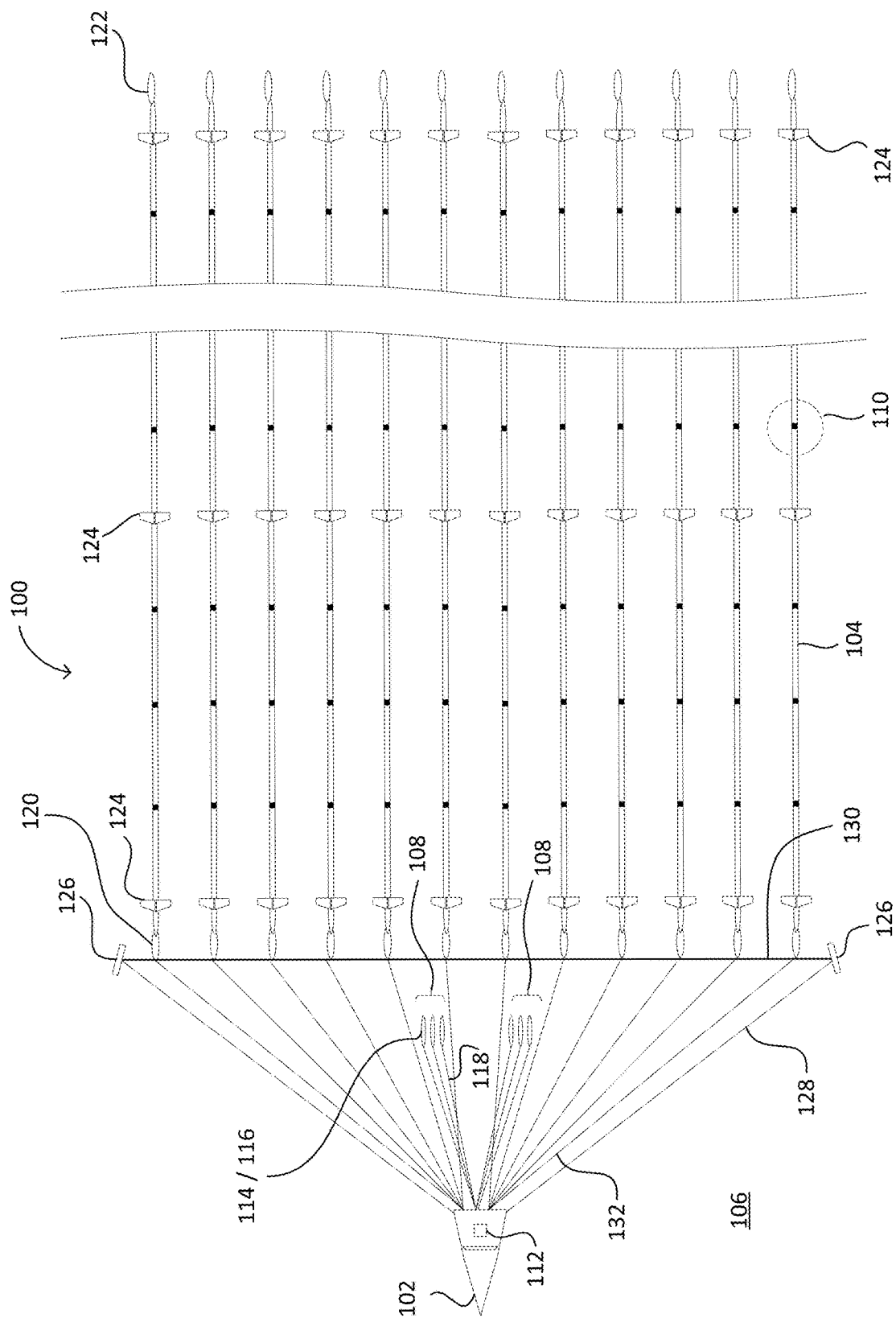
FIG. 1 is a top view illustrating an example towed streamer marine seismic survey.
Figure 2:
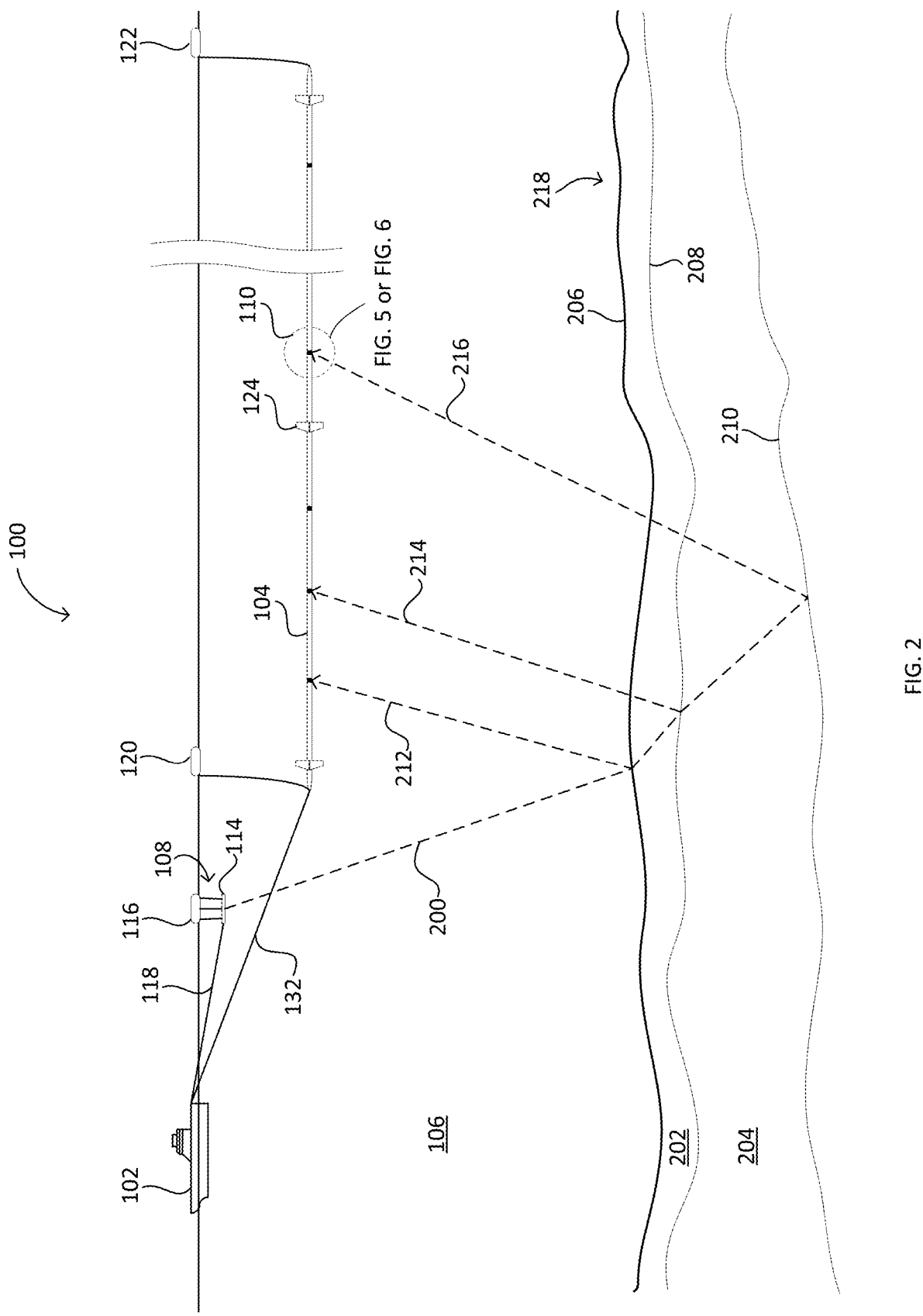
FIG. 2 is a side view illustrating further aspects of the towed streamer marine seismic survey of FIG. 1.

FIGS. 1 and 2 present top and side views, respectively, of an example towed streamer marine seismic survey system 100. Survey system 100 is representative of a variety of similar geophysical survey systems in which a vessel 102 tows an array of elongate streamers 104 in a body of water 106 such as an ocean, a sea, a bay, or a large lake. Vessel 102 is shown towing twelve streamers 104 in the illustrated example. In other embodiments, any number of streamers may be towed, from as few as one streamer to as many as twenty or more. Embodiments to be described below have useful application in relation to towed streamer surveys such as that depicted in FIGS. 1 and 2. They may also have useful application in other environments in which other types of sensors or sensor cables are used—for example, in environments that use ocean-bottom sensor cables or ocean-bottom nodes either in lieu of or in addition to towed streamers. The terms "streamer" and "cable" may be used interchangeably below.

During a typical marine seismic survey, one or more seismic sources 108 are activated to produce acoustic energy 200 that propagates in body of water 106. Energy 200 penetrates various layers of sediment and rock 202, 204 in a subsurface earth volume 218 underlying body of water 106. As it does so, it encounters interfaces 206, 208, 210 between materials having different physical characteristics, including different acoustic impedances. At each such interface, a portion of energy 200 is reflected upward while another portion of the energy is refracted downward and continues toward the next lower interface, as shown. Reflected energy 212, 214, 216 is detected by sensors 110 disposed at intervals along the lengths of streamers 104. In FIGS. 1 and 2, sensors 110 are indicated as black squares inside each of streamers 104. Sensors 110 produce signals corresponding to the reflected energy. These signals are collected and recorded by control equipment 112 located onboard vessel 102. The recorded signals may be processed and analyzed onboard vessel 102 and/or at one or more onshore data centers to produce images of structures within subsurface 218. These images can be useful, for example, in identifying possible locations of hydrocarbon reservoirs within subsurface 218.

In the illustrated example, vessel 102 is shown towing a total of two sources 108. In other systems, different numbers of sources may be used, and the sources may be towed by other vessels, which vessels may or may not tow streamer arrays. Typically, a source 108 includes one or more source subarrays 114, and each subarray 114 includes one or more acoustic emitters such as air guns or marine vibrators. A distinction between a "source" as used herein and a source subarray is that the crossline distance between two or more "sources" towed during a survey is greater than the crossline distance between subarray elements within any one of the two or more sources.

Each subarray 114 may be suspended at a desired depth from a subarray float 116. Compressed air as well as electrical power and control signals may be communicated to each subarray via source umbilical cables 118. Data may be collected, also via source umbilical cables 118, from various sensors located on subarrays 114 and floats 116, such as acoustic transceivers and global positioning system ("GPS") units. Acoustic transceivers and GPS units so disposed help to accurately determine the positions of each subarray 114 during a survey. In some cases, subarrays 114 may be equipped with steering devices to better control their positions during the survey.

Streamers 104 are often very long, on the order of 5 to 10 kilometers, so usually are constructed by coupling numerous shorter streamer sections together. Each streamer 104 may be attached to a dilt float 120 at its proximal end (the end nearest vessel 102) and to a tail buoy 122 at its distal end (the end farthest from vessel 102). Dilt floats 120 and tail buoys 122 may be equipped with GPS units as well, to help determine the positions of each streamer 104 relative to an absolute frame of reference such as the earth. Each streamer 104 may in turn be equipped with acoustic transceivers and/or compass units to help determine their positions relative to one another. In many survey systems 100, streamers 104 include steering devices 124 attached at intervals, such as every 300 meters. Steering devices 124 typically provide one or more control surfaces to enable moving the streamer to a desired depth, or to a desired lateral position, or both. Paravanes 126 are shown coupled to vessel 102 via tow ropes 128. As the vessel tows the equipment, paravanes 126 provide opposing lateral forces that straighten a spreader rope 130, to which each of streamers 104 is attached at its proximal end. Spreader rope 130 helps to establish a desired crossline spacing between the proximal ends of the streamers. Power, control, and data communication pathways are housed within lead-in cables 132, which couple the sensors and control devices in each of streamers 104 to the control equipment 112 onboard vessel 102.

Collectively, the array of streamers 104 forms a sensor surface at which acoustic energy is received for recording by control equipment 112. In many instances, it is desirable for the streamers to be maintained in a straight and parallel configuration to provide a sensor surface that is generally flat, horizontal, and uniform. In other instances, an inclined and/or fan shaped receiving surface may be desired and may be implemented using control devices on the streamers such as those just described. Other array geometries may be implemented as well. Prevailing conditions in body of water 106 may cause the depths and lateral positions of streamers 104 to vary at times, of course. In various embodiments, streamers 104 need not all have the same length and need not all be towed at the same depth or with the same depth profile.

Sensors 110 within each streamer 104 may include one or more different sensor types such as pressure sensors (e.g. hydrophones), velocity sensors (e.g. geophones), and/or acceleration sensors such as micro-electromechanical system ("MEMS") devices.

Figure 3:
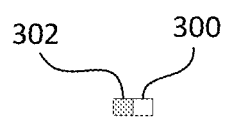
FIG. 3 is a schematic view illustrating an example geophysical sensor comprising a co-located hydrophone and geophone.
Figure 4:
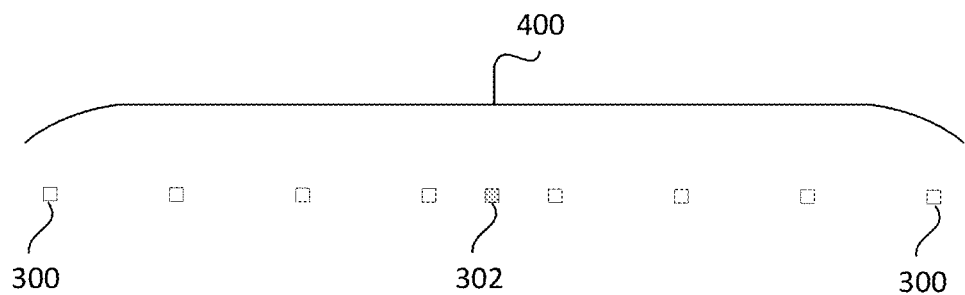
FIG. 4 is a schematic view illustrating an example geophysical sensor group.

FIGS. 3 and 4 illustrate two example arrangements according to embodiments for disposing sensors 110 in a streamer 104, or in an ocean bottom cable 502, or in an ocean bottom node 602. In both illustrations, pressure sensors are indicated with white squares, while motion sensors such as velocity or acceleration sensors are indicated with shaded squares. In the arrangement of FIG. 3, a pressure sensor 300 is collocated with a motion sensor 302 inside a streamer 104. In the arrangement of FIG. 4, a set of pressure sensors 300 forms a single pressure sensor group 400 inside a streamer 104. Although eight pressure sensors are shown in the illustrated example sensor group, in various embodiments a different number of sensors may be included in any given sensor group. A motion sensor 302 is shown disposed substantially at the center of pressure sensor group 400. Typically, the signals generated by sensors forming a sensor group are combined or aggregated in some way, such as by summation and/or averaging. Such combination or aggregation may be accomplished in any suitable manner, such as in an analog domain using appropriate electrical coupling, or in a digital domain using digital data processing. In general, a sensor group may include any number of sensors and may comprise either pressure sensors or motion sensors. Normally, however, only measurements of the same type in a group (e.g. pressure, velocity, or acceleration) would be subject to combination or aggregation. Thus, in the arrangement of FIG. 4, the measurements of pressure sensors 300 may be combined or aggregated into a single signal, while the measurements of motion sensor 302 would be preserved as a separate signal. In other embodiments, streamers may be employed that contain only pressure sensors and no motion sensors.

While some embodiments may employ pressure sensors and motion sensors jointly, as generally described above, other embodiments may employ only a single type of geophysical sensor. For example, some embodiments may employ pressure sensors only.

Figure 5:
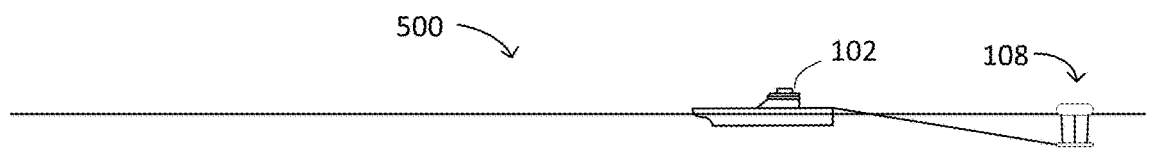
FIG. 5 is a side view illustrating an example ocean bottom cable survey.
Figure 5:
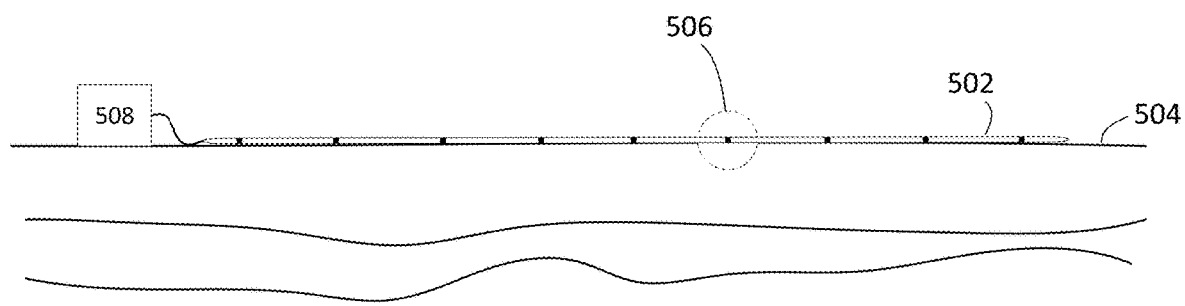

FIG. 5 illustrates an example ocean bottom cable survey system 500, in which a vessel 102 tows one or more sources 108 over an installation of one or more ocean bottom cables 502, each of which is disposed on a water bottom 504. Each cable 502 may include one or more sensors or sensor groups 506 disposed along its length, generally as shown. In turn, each of the cables may be coupled to a manifold 508 in which signals from the sensors may be aggregated and either stored or transmitted to a collection point, or both.

Figure 6:
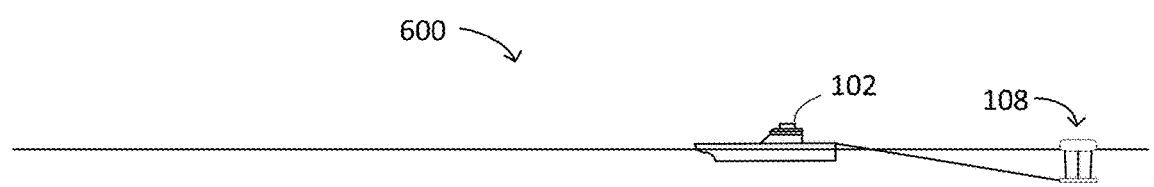
FIG. 6 is a side view illustrating an example ocean bottom node survey.
Figure 6:
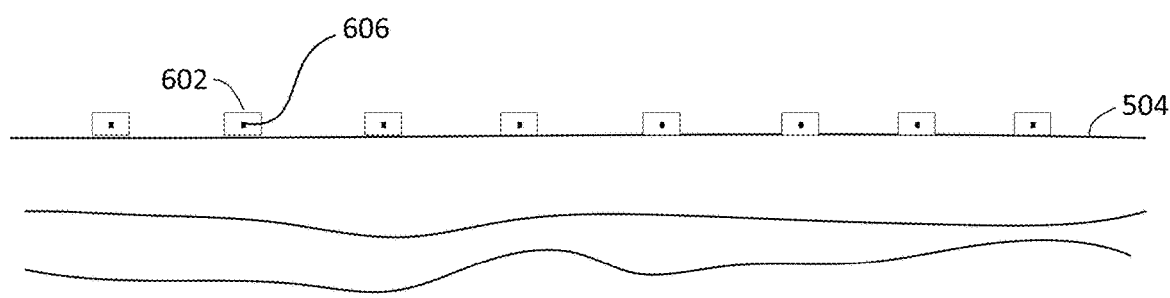

FIG. 6 illustrates an example ocean bottom node survey system 600, in which a vessel 102 tows one or more sources 108 over an installation of one or more ocean bottom nodes 602, each of which is disposed on a water bottom 504. Each node 602 may include one or more sensors or sensor groups 606 as shown. Signals generated by the sensors or sensor groups may be collected in the nodes for later retrieval, or may be transmitted to a collection point, or both.

Techniques to be described herein may be employed in the context of any of the above or similar types of marine seismic surveys.

Impulsive Source Activations in Marine Seismic Surveying

Two general classes of marine seismic sources are impulsive sources and non-impulsive sources. Examples of non-impulsive sources are marine vibrators, which typically emit sound waves of varying frequencies in a body of water over a relatively long period of time—on the order of seconds or minutes—often in response to a sweep signal that begins at a lower frequency and transitions to higher frequencies, or vice versa, during the sweep. In contrast to marine vibrators, impulsive marine seismic sources emit a single impulse in the body of water responsive to an activation signal. The energy associated with such an impulse is typically emitted over a very short period of time—on the order of milliseconds. A common example of an impulsive marine seismic source is an air gun, which is designed to inject pressurized air into a body of water in response to the activation signal. Air guns and other impulsive marine seismic sources are characterized in that they are capable of delivering a short primary impulse that is significantly more energetic than any secondary reverberations that may occur in the body of water due to, for example, bubble effects.

In some embodiments, an impulsive marine seismic source may comprise a single air gun or impulse emitter. In other embodiments, an impulsive source may comprise an array of such air guns or impulse emitters. In still other embodiments, such an array may be organized into two or more subarrays, each of which may include one or more air guns or impulse emitters. Each of the impulsive emitters within a subarray may be activated individually or simultaneously to produce a primary impulse. In turn, each of the subarrays within a source array may be actuated individually or simultaneously to produce a primary impulse. The generation of a primary impulse in a body of water by any of these or similar means is referred to herein as an "impulsive source activation."

Near and Far Offsets in Marine Seismic Surveys

Figure 7:
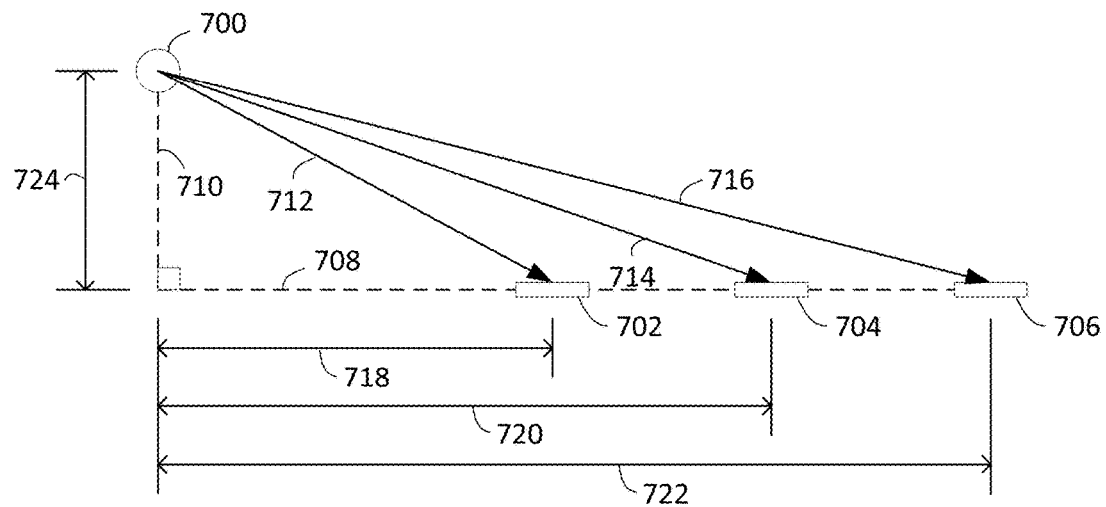
FIG. 7 is a schematic view illustrating various offsets in a marine seismic survey.

FIG. 7 is provided to illustrate the concept of offset in marine seismic surveys. In the figure, circle 700 represents an impulsive source, while each of rectangles 702, 704, 706 represents a sensor or sensor group. For example, sensors or sensor groups 702-706 may represent sensors disposed along the length of a single streamer 104, or may represent sensors in distinct ocean bottom nodes 602 or sensors disposed within an ocean bottom cable 502. Dashed line 708 depicts an inline direction. Dashed line 710 depicts a crossline direction orthogonal to the inline direction. Typically, a vessel towing a source would follow a sail path parallel to the inline direction 708.

The distance between a source and any one sensor or sensor group constitutes an offset. Such an offset may be measured from the source to a single sensor, or to any one of the sensors within a sensor group, or to the center of a sensor group. Three different offsets are illustrated in the drawing, ranging in length from a smallest offset 712, to an intermediate length offset 714, to a largest offset 716. A distance along the straight line path between a source and a given sensor or sensor group, as depicted by arrows 712-716, is commonly referred to as a "seismic offset" or simply an "offset." A distance along direction 708 between a source and the inline projection of a sensor or sensor group is commonly referred to as an "inline offset." Thus, sensor or sensor group 702 defines a smallest inline offset 718 with respect to source 700, sensor or sensor group 704 defines an intermediate length inline offset 720 with respect to the source, and sensor or sensor group 706 defines a largest inline offset 722 with respect to the source. Similarly, a distance along direction 710 between a sensor or sensor group and the crossline projection of the source is commonly referred to as a "crossline offset." In the illustrated example, each of sensors or sensor groups 702-706 defines the same crossline offset 724 with respect to source 700.

The term "offset" as used herein refers to any of the above-described distances.

The terms "near offset source" and "far offset source" are relative terms as used herein. They are defined in relation to the respective distances between two sources used in a marine seismic survey and an array of sensors used in the same survey, as follows: Relative to a "near offset source" used in a given survey, a "far offset source" is any source whose offset from a given sensor in the array of sensors is longer than the offset between the near offset source and the same sensor. In some embodiments in which an array of sensors is employed, a smallest far offset between a far offset source and a sensor in the array may be larger than a largest near offset between a near offset source and a sensor in the array. In towed streamer surveys, a near offset source is often towed by the same vessel that tows the streamer array, while a far offset source is towed by a separate vessel. A "far offset vessel" as used herein refers to a vessel that tows a far offset source, and a "far offset shot point" as used herein refers to a location at which an activation of the far offset source occurs. Similarly, a "near offset vessel" as used herein refers to a vessel that tows a near offset source, and a "near offset shot point" as used herein refers to a location at which an activation of the near offset source occurs.

Figure 8:
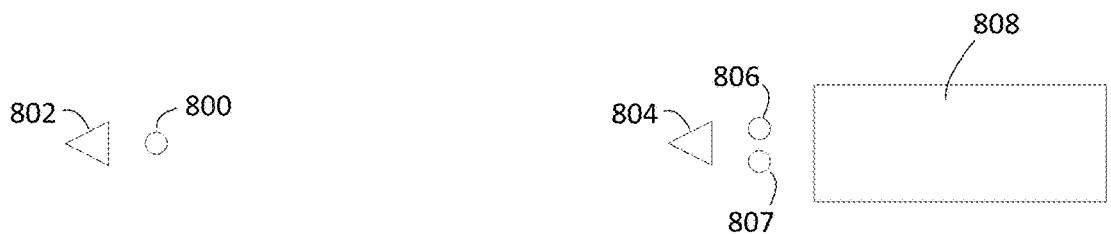
FIGS. 8-10 are top views illustrating a number of example towing arrangements for marine seismic sources and streamer arrays according to embodiments.
Figure 9:
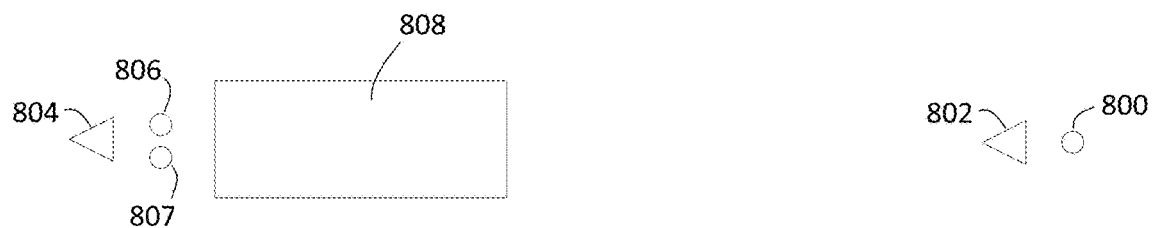
Figure 10:
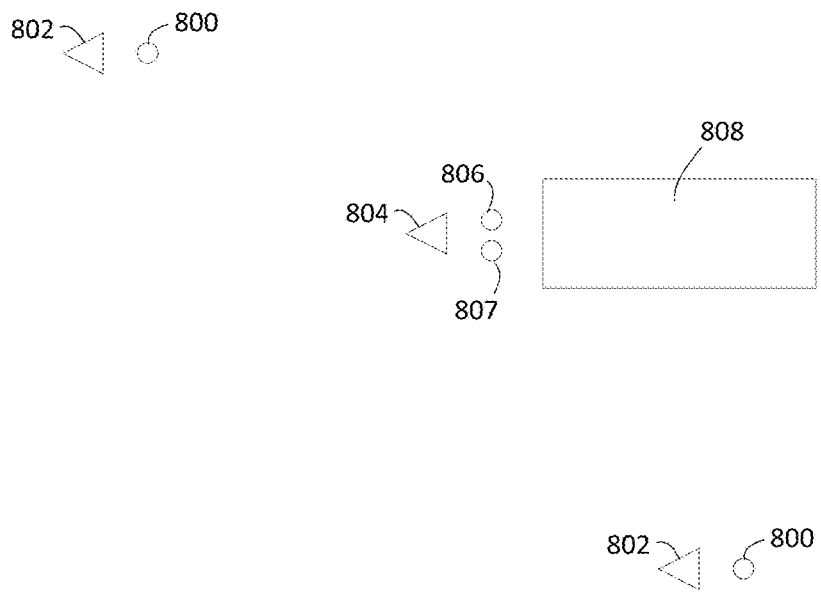

FIGS. 8-10 illustrate several possible arrangements for near and far offset sources in marine seismic surveys according to embodiments. The arrangements are shown by way of example and not by way of limitation. In the arrangement of FIG. 8, a single far offset source 800 is towed by a far offset vessel 802, while a near offset vessel 804 sailing aft of the far offset vessel tows two near offset sources 806, 807 and an array of streamers 808. As can be seen from the figure, the distances between far offset source 800 and any one sensor in the array 808 is larger than a corresponding distance between either of the near offset sources and the same sensor. The arrangement of FIG. 9 is similar except that, in the arrangement of FIG. 9, far offset vessel 802 sails aft of near offset vessel 804. As was the case in FIG. 8, the distance between far offset source 800 and any one sensor in the array 808 in FIG. 9 is larger than a corresponding distance between either of the near offset sources and the same sensor.

In general, embodiments may include any arrangement of near and far offset sources in a given survey, and the near and far offset sources need not be in-line with one another. By way of example, FIG. 10 depicts an arrangement according to embodiments in which a near offset vessel 804 tows near offset sources 806, 807 and a sensor array 808, while two or more far offset vessels 802 tow far offset sources 800, neither of which is inline with the near offset sources. Instead, one of the far offset sources in the arrangement of FIG. 10 is towed ahead of and to the starboard side of the array of sensors 808, and the other far offset source is towed adjacent to and to the port side of the array of sensors. Many other arrangements are possible, either in conjunction with towed streamers, with ocean bottom nodes or cables, or with various combinations thereof. In any such arrangements, any or all of the far offset vessels may tow more than one far source or source subarray, and any or all of the near offset vessels may tow one or more near offset sources or source subarrays.

Shot Points and Shot Point Intervals

Figure 11:
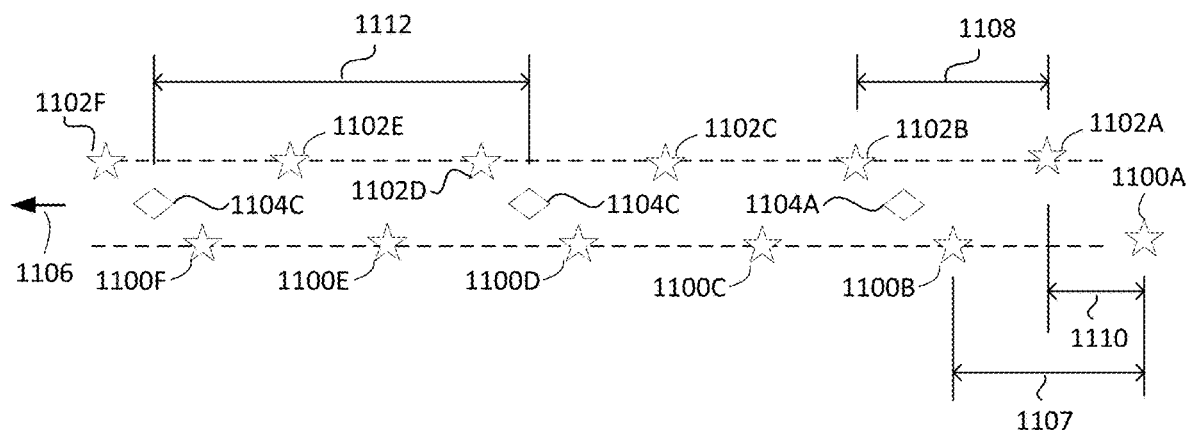
FIG. 11 is a top view illustrating near and far offset source activations according to a conventional technique.

FIG. 11 is provided to schematically illustrate the general concepts of shot points and shot point intervals in marine seismic surveys. FIG. 11 presents a series of seismic source activations according to a conventional shooting pattern in which each shot point corresponds to a single impulsive source activation. In the diagram, stars indicate near offset impulsive source activations while diamonds indicate far offset impulsive source activations. Stars 1100 may correspond, for example, to activations of the port near offset source 807 in any of the arrangements of FIGS. 8-10, and stars 1102 may correspond to activations of the starboard near offset source 806 in the same arrangements. Diamonds 1104 may correspond to activations of a conventional far offset source in a survey, such as any one of the far offset sources 800 shown in the arrangements of FIGS. 8-10 (with appropriate adjustments made for their crossline positions).

As survey vessels move in a tow direction 1106, source activations may be caused by equipment aboard the vessels according to the pattern depicted in FIG. 11 as follows: Near offset source 807 is activated at near offset shot point 1100A, followed in time by an activation of near offset source 806 at near offset shot point 1102A. This pattern repeats such that further activations of the near offset sources occur at shot points 1100B and 1102B, then at 1100C and 1102C, and so on as indicated. The spacing in time or distance between the near offset shot points establishes a near offset shot point interval. In the pattern of FIG. 11, for example, the spacing between each of activations 1100 establishes a near offset shot point interval 1107 for the port side near offset source, and the spacing between each of activations 1102 establishes a near offset shot point interval 1108 for the starboard side near offset source. The combined shot points of all near offset sources used in the survey establishes an overall near offset shot point interval 1110. Similarly, the spacing in time or distance between far offset shot points 1104A, 1104B, 1104C in FIG. 11 establishes a far offset shot point interval 1112.

Signal Energy Requirements and Environmental Energy Limits

One problem exhibited by conventional methods relates to signal energy requirements and environmental energy limits.

Figure 12:
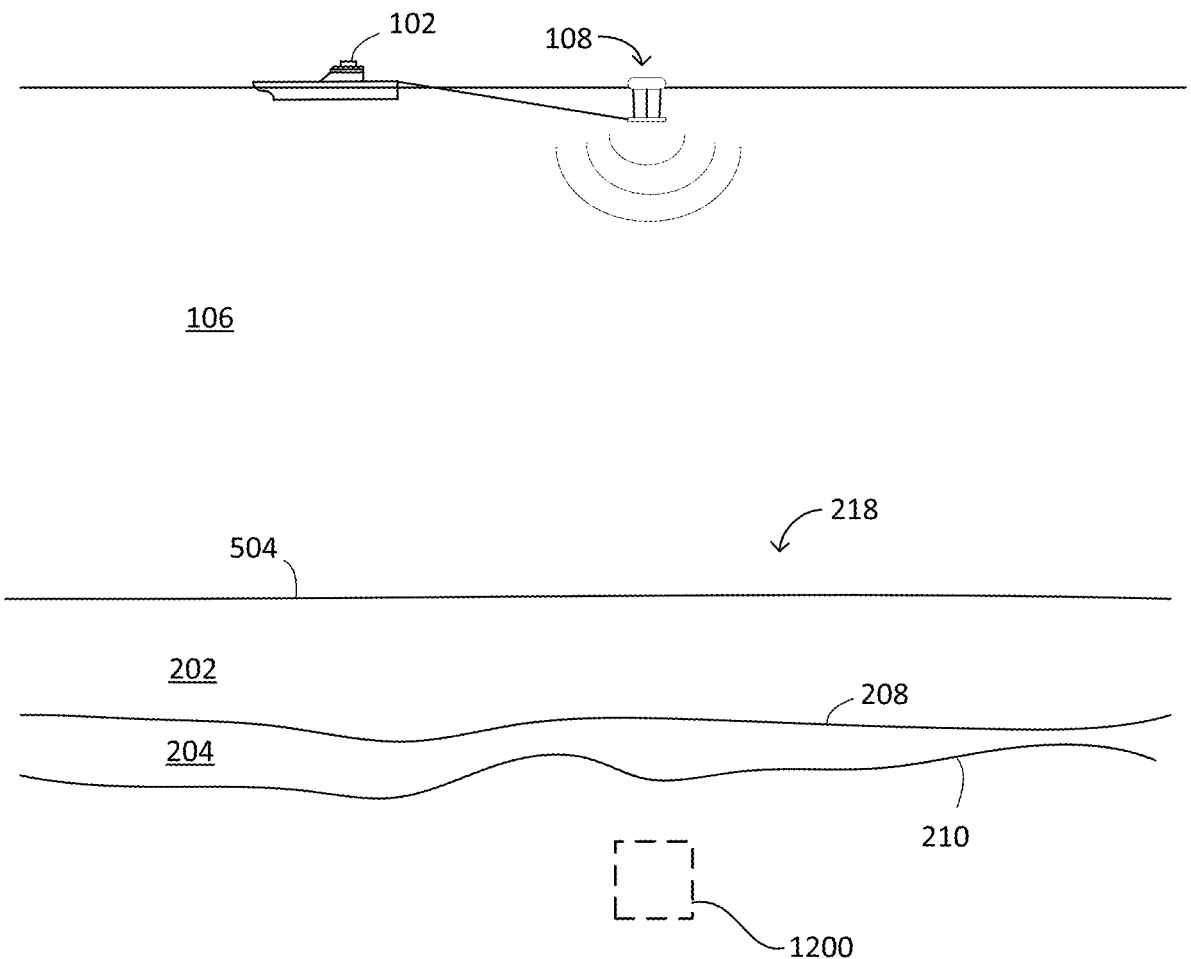
FIG. 12 is a side view illustrating a point of interest in a subsurface during a marine seismic survey.

As the diagram of FIG. 12 illustrates, it is sometimes necessary to determine the velocity at which sound propagates at a point of interest 1200 located a significant depth below a water bottom 504 within a subsurface volume 218. To do so adequately, it is necessary for acoustic waves propagating from a seismic source 108 to reach the point of interest 1200 with sufficient energy levels so that reflections therefrom may be registered with acceptable signal to noise ratios by seismic sensors located in towed streamers or on the water bottom. Energy levels that must be achieved at a point of interest in a subsurface in order to ensure acceptable signal to noise ratios in recorded reflections are referred to herein as "signal energy requirements."

When conventional methods are employed, generally the deeper a point of interest lies below the water bottom, the higher are the energy levels that must be emitted from a seismic source in order to achieve a requisite energy level at the point of interest within the subsurface. This is because acoustic energy is attenuated as it propagates downward through earth layers and back again to seismic sensors. Limits exist, however, as to the levels of sound energy that may be emitted safely by an impulsive seismic source in a body of water without potentially causing harm to sea life. For this reason, when issuing permits for marine seismic surveying activities, many jurisdictions impose limits on the levels of sound energy that may be emitted by impulsive seismic sources used by the companies that will operate under the permits. Any such limit is referred to herein as an "environmental energy limit."

When conventional methods are employed, each impulsive source activation emitted in the body of water must be sufficiently energetic to meet signal energy requirements at points of interest within the subsurface without exceeding environmental energy limits that are relevant to the survey area. In some cases, therefore, it is not possible to satisfy both criteria using only conventional techniques.

Interference Between Near and Far Offset Source Energy

Figure 13:
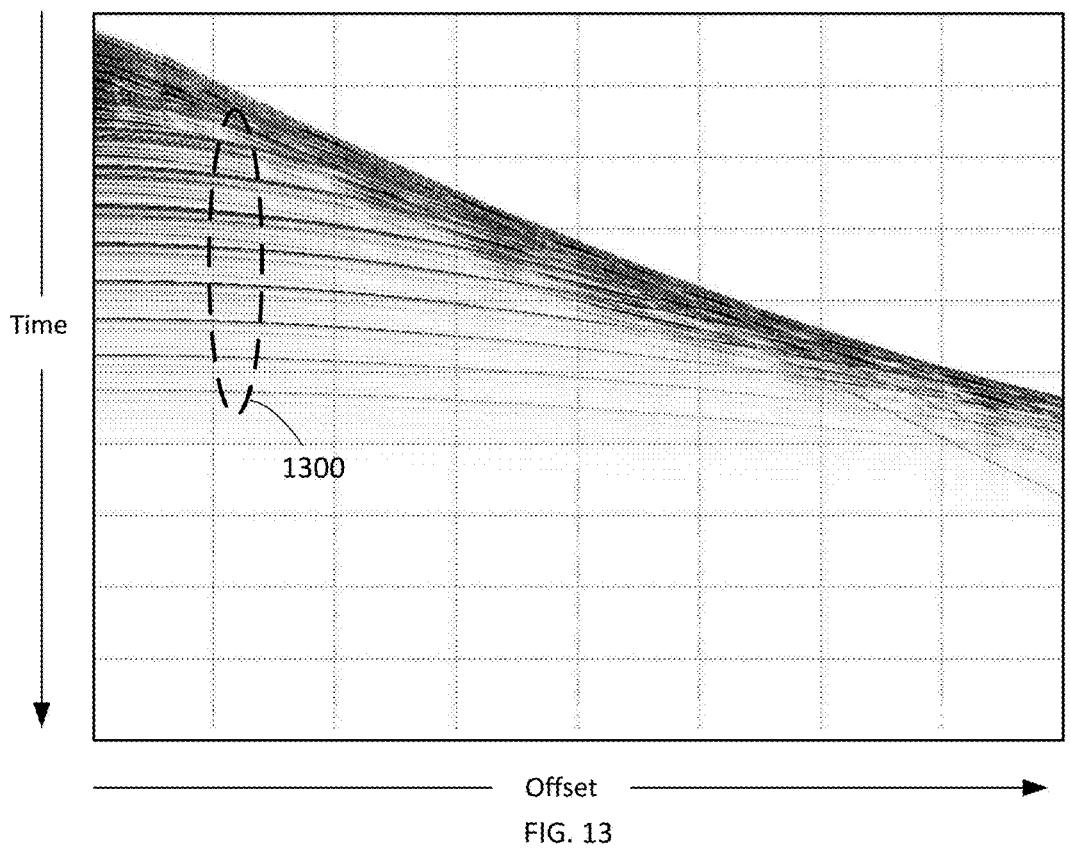
FIG. 13 is a graph illustrating marine seismic traces corresponding to a conventional near offset shot.
Figure 14:
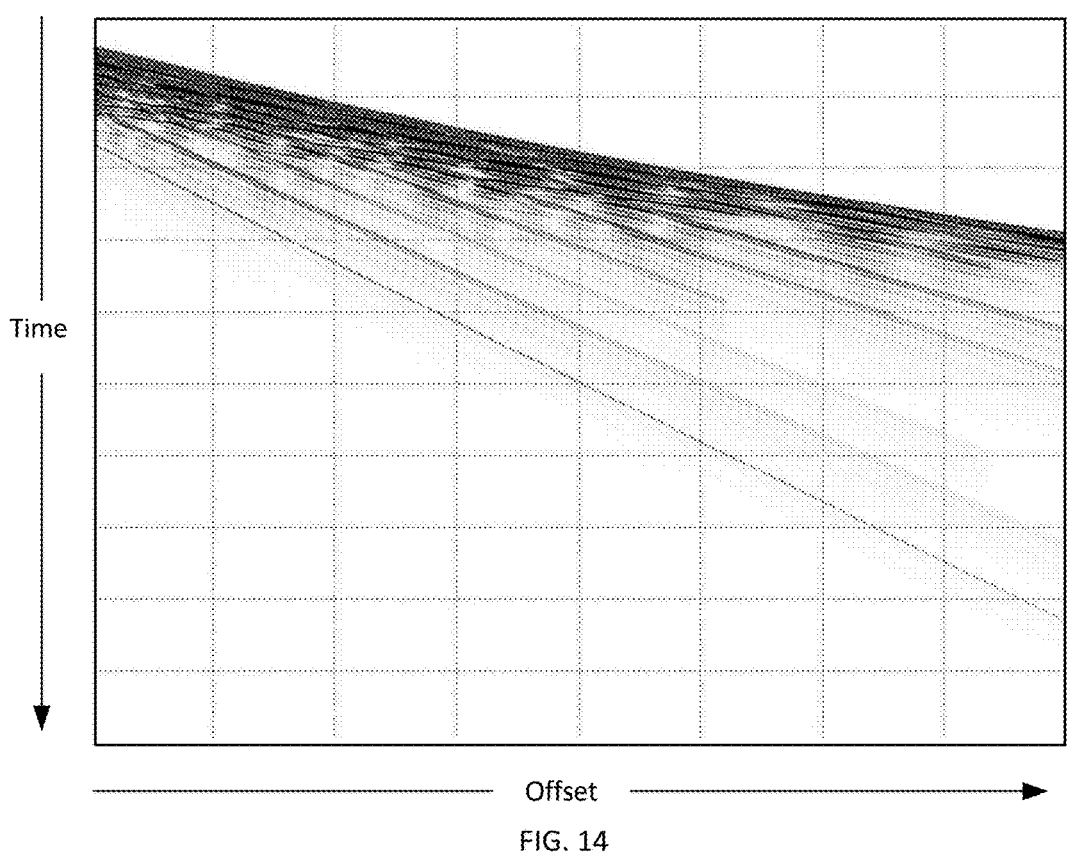
FIG. 14 is a graph illustrating marine seismic traces corresponding to a conventional far offset shot.
Figure 15:
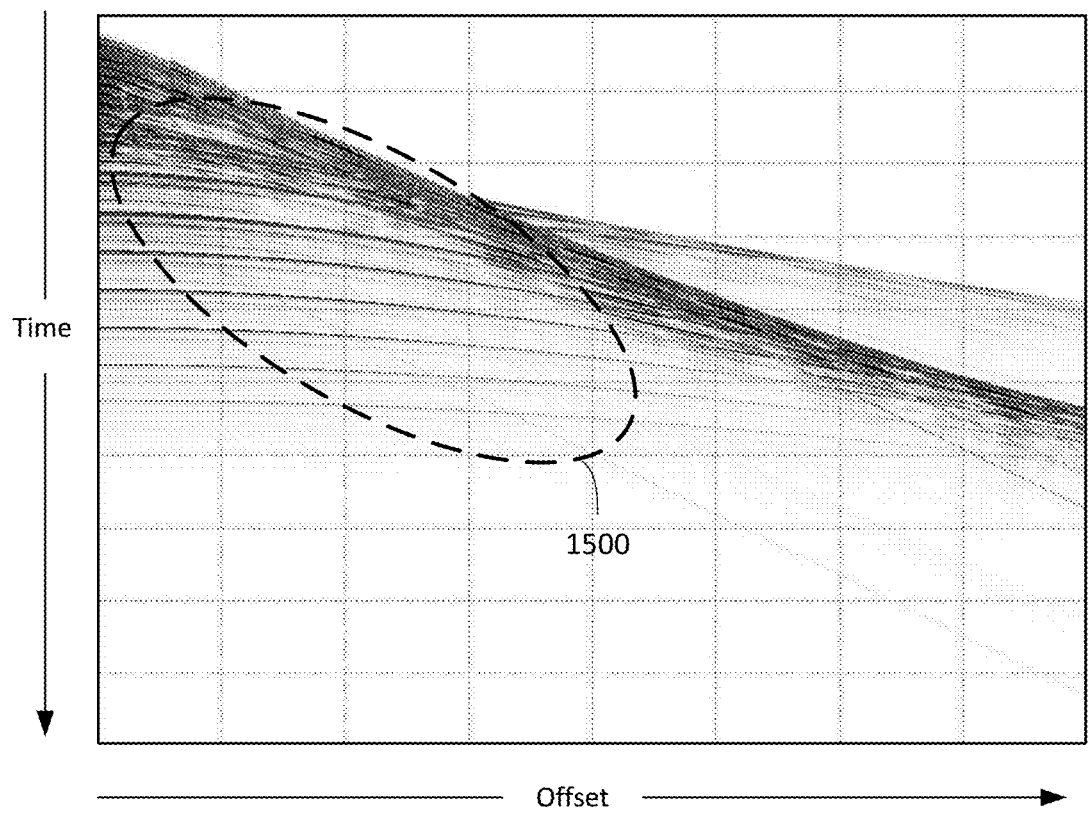
FIG. 15 is a graph illustrating interference that results in marine seismic traces when the near offset shot of FIG. 16 and the far offset shot of FIG. 17 are recorded together.

Another problem that arises in relation to conventional methods such as the one illustrated in FIG. 11 is that acoustic energy due to far offset impulsive source activations can interfere, in the recorded seismic data, with acoustic energy that is due to near offset source activations. FIGS. 13-15 illustrate this problem.

FIG. 13 presents a gather of marine seismic traces corresponding to a single activation of a near offset impulsive source. The traces are shown here isolated from far offset energy for purposes of illustration. The striations visible at 1300 represent a series of reflections from reflectors disposed at different depths within the subsurface. FIG. 14 presents a gather of marine seismic traces corresponding to a single activation of a far offset impulsive source according to conventional methods, shown here in isolation from near offset energy for purposes of illustration.

Note that, although FIGS. 13 and 14 show recorded energy from near and far offset sources isolated from one another for purposes of illustration, in reality the energy from the near and the far offset sources is recorded together in the same traces, as is illustrated in FIG. 15. FIG. 15 presents a gather of marine seismic traces that represent reflected energy from a single near offset source activation and a single far source activation recorded together in a blended fashion, as seismic data would ordinarily be collected in the field. As can be seen in the drawing, there is visible interference at 1500 in the area where the striations from reflectors would appear in the near offset source energy.

When seismic data are acquired using conventional methods such as these, the energy from the near and far offset impulsive sources would normally need to be "de-blended" in order to eliminate this interference. De-blending is a known computer-implemented process that is capable of separating energy from two different sources whose energy was blended together in recorded seismic signals. The de-blending process consumes substantial time and computing resources and thus adds cost and complexity to the processing of seismic data.

Composite Far Offset Impulsive Source Activations

The above and other problems may be addressed beneficially using a technique to be described next in relation to FIGS. 16-30.

Figure 16:
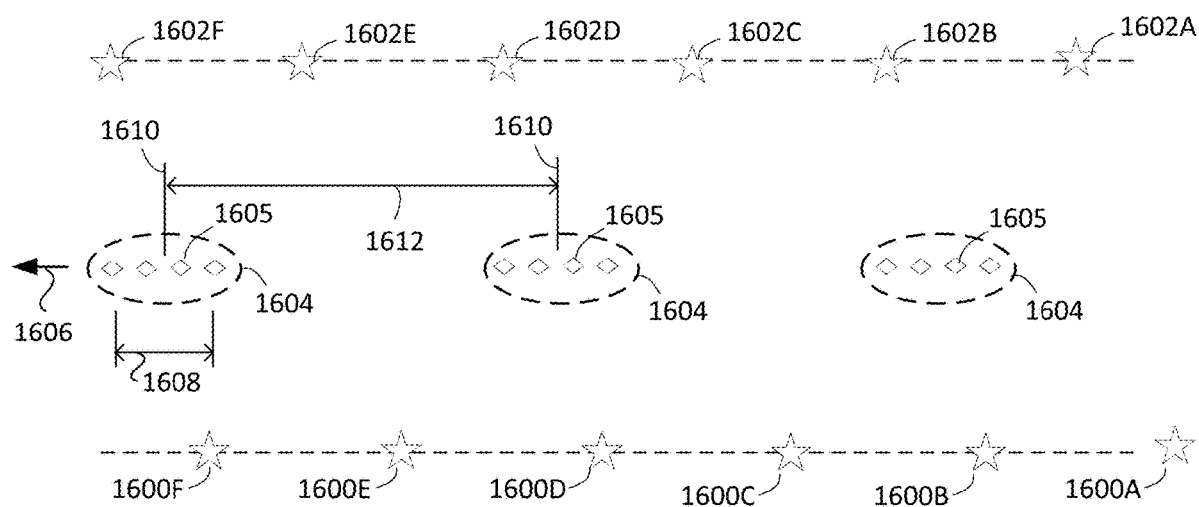
FIG. 16 is a top view schematically illustrating an example set of composite far offset source activations occurring in conjunction with a set of near offset source activations, according to embodiments.

FIG. 16 schematically illustrates a marine seismic shooting pattern that utilizes composite far offset impulsive source activations 1604 according to embodiments. The composite far offset impulsive source activations of FIG. 16 may be used in lieu of the single far offset impulsive source activations of FIG. 11. As in the diagram of FIG. 11, survey vessels in FIG. 16 move in a tow direction 1606 and may cause source activations using equipment aboard the survey vessels. The star shapes 1600, 1602 in FIG. 16 indicate near source impulsive source activations. Each of the near offset impulsive source activations 1600, 1602 occurs at a corresponding near offset shot point, and the time or distance between such near offset shot points establishes near offset shot intervals analogous to those of FIG. 11. Unlike in the diagram of FIG. 11, however, the diamond shapes in FIG. 16 indicate component impulsive source activations 1605 according to embodiments. Each component impulsive source activation 1605 occurs in a temporal succession of similar such component impulsive source activations, such that each succession of component impulsive source activations forms a composite impulsive source activation 1604. Given the tow direction indicated in the drawing at 1606, the component source activation represented by the right-most diamond in a given composite source activation 1604 would occur first in time, followed by the component source activation represented by the diamond to its left, and so on in sequence until a final component source activation occurs, represented in the drawing by the left-most diamond in the corresponding succession.

Three example composite far offset impulsive source activations 1604 are shown in the diagram, each of which comprises four component source activations 1605 for purposes of illustration. In other embodiments, each of the composite far offset impulsive source activations may comprise as few as two component source activations or may comprise arbitrarily many of such component source activations. In each such composite source activation, the succession of component source activations 1605 occurs over a far offset shot length 1608. The center of any given one of the far offset shot lengths 1608 may be taken as the "shot point" 1610 for the corresponding composite far offset impulsive source activation 1604. Depending on the timing of the component source activations in a given succession, the end points of the corresponding shot length may or may not coincide with the first and the last component source activations in the succession.

The time or distance between adjacent ones of the composite far offset shot points 1610 establishes a far offset shot point interval 1612 for the composite source activations. In some embodiments, the far offset shot point interval 1612 may be the same as the near offset shot point interval 1110.

In other embodiments, the far offset shot point interval 1612 may be longer than the near offset shot point interval 1110. FIG. 16 illustrates one example of the latter category of embodiments.

Combining the Acoustic Energy from Component Source Activations

One of the benefits provided by the use of composite far offset impulsive source activations according to embodiments relates to acoustic energy levels, as will now be discussed in relation to FIGS. 17 and 18.

Figure 17:
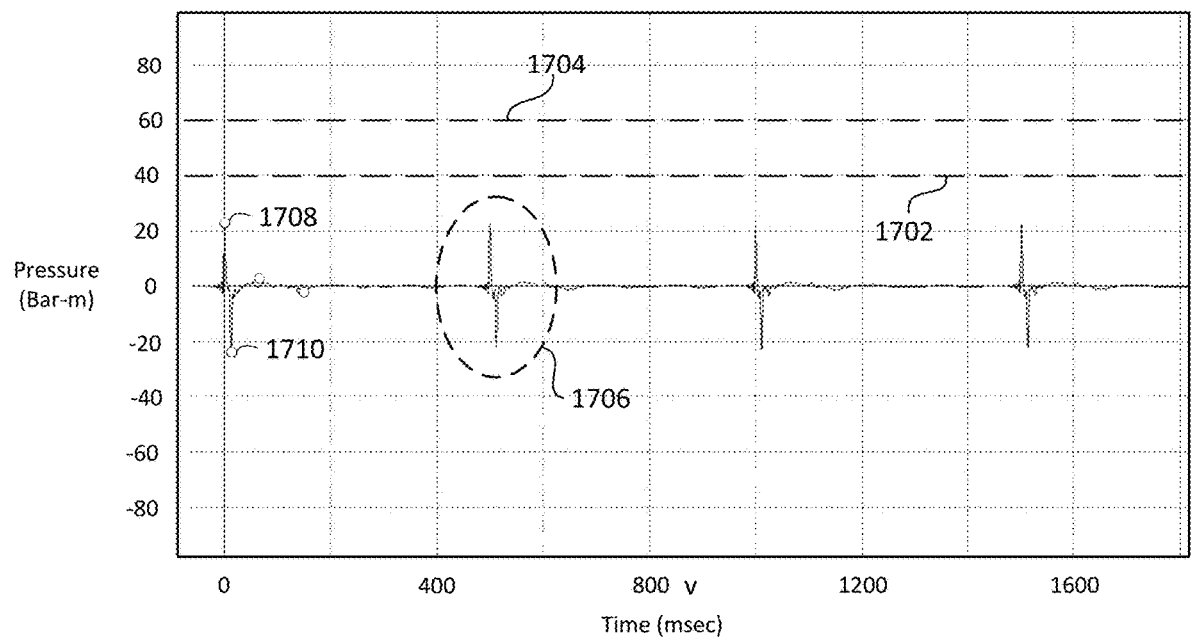
FIG. 17 is a graph illustrating energy levels of component far offset source activations in relation to a signal energy requirement and an environmental energy limit, according to embodiments.
Figure 18:
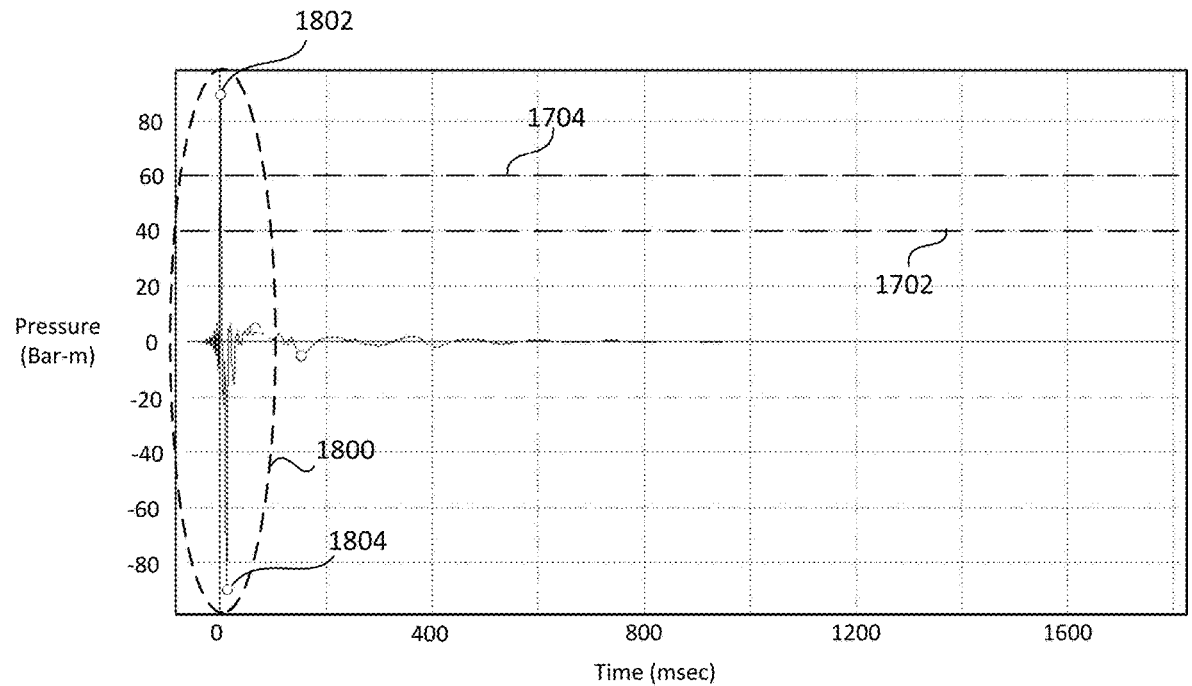
FIG. 18 is a graph illustrating a combined energy level of the component far offset source activations of FIG. 17 in relation to a signal energy requirement and an environmental energy limit, according to embodiments.

Each of FIGS. 17 and 18 is a graph showing acoustic energy levels with respect to time. In each of the graphs, energy levels are represented on the vertical axis as pressure levels, in units of Bar-meters. Time is represented on the horizontal axis in units of milliseconds. In each graph, dashed line 1702 represents an example environmental energy limit that may be relevant to a marine seismic survey, and dashed line 1704 represents a minimum signal energy requirement at a point of interest 1200 in a subsurface 218 being surveyed.

FIG. 17 illustrates a representative one of the composite far offset impulsive source activations 1604 of FIG. 16. The illustrated composite source activation comprises four component source activations, each of which corresponds to one of the four energy peaks 1706 depicted in the graph. In the scenario illustrated, the signal energy requirement at the point of interest 1200 is approximately 60 Bar-meters, but the relevant environmental energy limit is approximately 40 Bar-meters. Thus, using the conventional technique of FIG. 11, it would not be possible to satisfy the signal energy requirement without exceeding the environmental energy limit. When using the composite far offset impulsive source activations described above, however, it is possible to satisfy both constraints: Each component impulsive source activation can be emitted at an acoustic energy level that is below both the signal energy requirement 1704 and the environmental energy limit 1702. In the scenario illustrated, for example, each of the component impulsive source activations emits an energy level of approximately 22.7 Bar-meters as can be seen at the circled peaks 1708, 1710. These energy levels are shown by way of example only and are for purposes of illustration. In other embodiments, other energy levels may be used.

Later, during data processing, the energy from component source activations can be combined either directly or indirectly. By way of example, FIG. 18 illustrates a combination 1800 of energy from the four component impulsive source activations 1706 of FIG. 17. As can be seen at circled peaks 1802, 1804, the combination of the energy levels emitted during each of the four component impulsive source activations is approximately 89.7 Bar-meters. Thus, the combined energy 1800 meets the signal level requirement of 60 Bar-meters at the point of interest 1300, as desired. In the illustrated example, the combined energy 1800 also exceeds the environmental energy limit 1702. The environmental energy limit need not actually be exceeded in the field, however, because only the lower-energy component impulsive source activations need actually to be emitted in the field during the performance of the survey.

The phrases "combination of energy" and "combined energy" as used herein refer to the results of any of a variety of data processing techniques in which the information from multiple component source activations is extracted from recorded data and is used in combination—directly or indirectly—to represent energy that should be associated with a single far offset shot point. A data processing technique that may be employed to achieve such a combination of energy indirectly is to apply the known process of full waveform inversion, to be further described below. A data processing technique that may be employed to achieve such a combination of energy directly is to employ autocorrelation-driven processing tools to, in effect, sum the energy that is produced by multiple component source activations. The use of other data processing techniques to achieve such a combination of energy is also possible, as will be apparent to persons having skill in the art and having reference to this disclosure.

Frequencies of Interest for Far Offset Shot Points

Recorded energy from far offset source activations in a marine seismic survey may be useful in various contexts.

One such context is that of full waveform inversion ("FWI"). FWI is a known technique that can be used to generate a velocity model of a subsurface of interest in a seismic survey. Once a velocity model of the subsurface has been established, it can be used as one of the inputs to an imaging process used to generate an image of subsurface geological features based on the recorded seismic data. Far offset source energy is especially helpful when performing an FWI—particularly when performing a so-called "transmission" FWI, which is used to establish a low-resolution but very stable starting model during the process of developing the velocity model. When performing any type of FWI to generate a velocity model, generally the frequencies of interest in the recorded seismic data are low frequencies—up to about 15 Hz. Thus, frequencies of interest for far offset shot points when using recorded seismic data for FWI are typically those frequencies up to about 15 Hz.

Another context in which far offset source energy is useful is the context of amplitude versus offset ("AVO") analysis. AVO analysis is a known technique used to extract information about the geology of a subsurface by analyzing how waveforms reflected from the subsurface change as a function of offsets. In some cases, such as when AVO analysis is to be used for points of interest located at large depths within the subsurface ("deep targets"), very far offsets are needed in order to extract the desired information. The term "deep target" can be relative in this context but would include, for example, any target for which the information available from near offset shot records covers an insufficient range of incidence angles to perform AVO analysis adequately. When performing AVO analysis for deep targets in this context, generally the frequencies of interest are also low—on the order of 30 Hz to 50 Hz. Thus, frequencies of interest for far offset shot points when using recorded seismic data for deep-target AVO analysis are typically those frequencies up to about 50 Hz.

Other uses for far offset source energy may correspond to other frequencies of interest.

Stationary Source Assumption for Frequencies of Interest

When emitting composite far offset impulsive source activations 1604 according to embodiments, it is useful to limit the corresponding far offset shot lengths 1608 such that each far offset composite source activation satisfies a stationary source assumption for frequencies that are of interest for the corresponding far offset shot points 1610.

Figure 19:
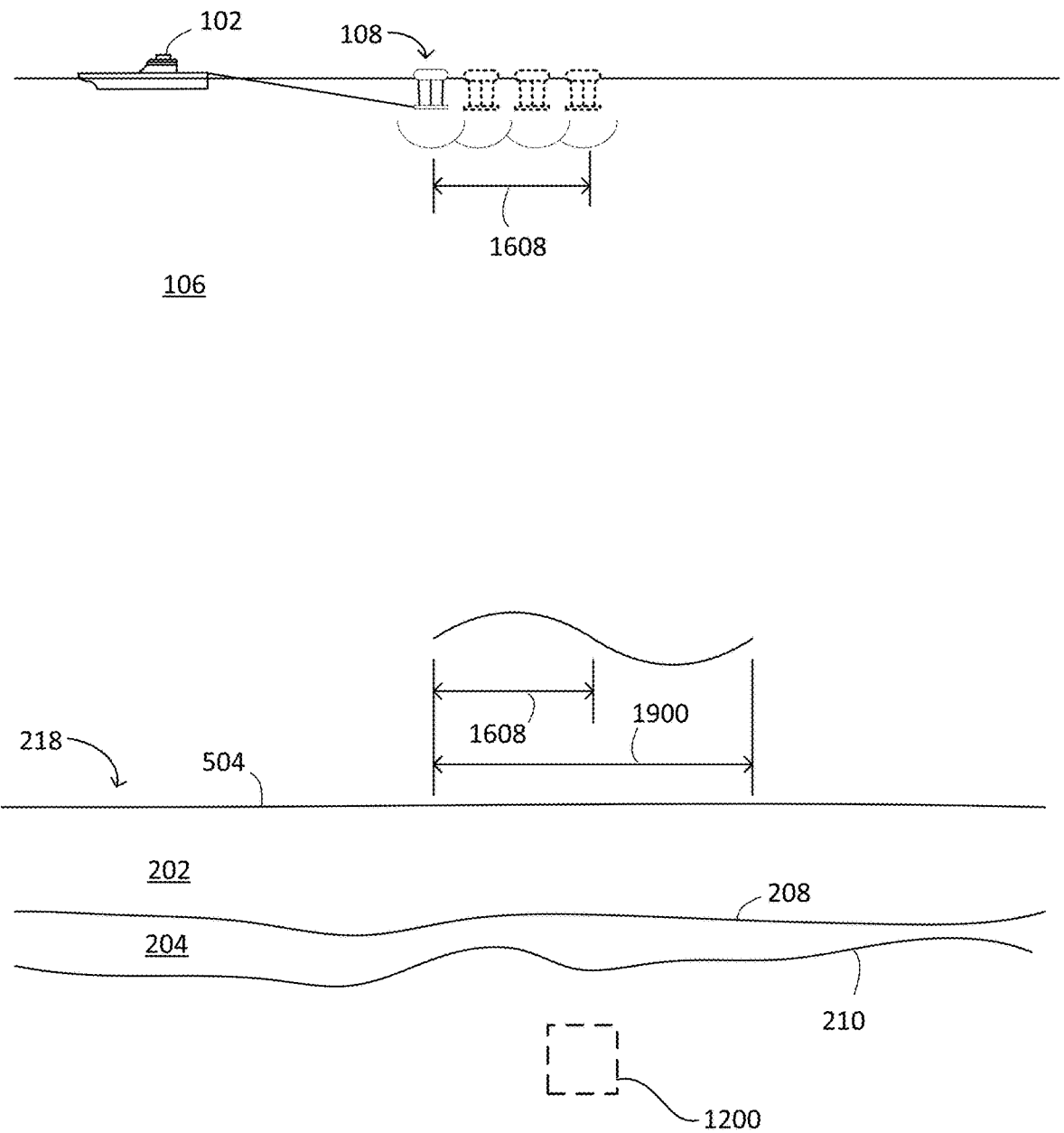
FIG. 19 is a side view schematically illustrating a far offset shot length corresponding to a composite far offset impulsive source activation according to embodiments.

Referring now to FIG. 19, satisfying the stationary source assumption may be accomplished in a number of ways—one of which is to ensure that the far offset shot length 1608 is not greater than one half of one wavelength 1900 for acoustic energy in the body of water 106 at a maximum frequency of interest for the far offset shot points 1610, as shown. This is so because limiting the far offset shot length to one half wavelength corresponds to the Nyquist criterion, which specifies that two samples per wavelength at a highest frequency of interest is sufficient to sample the information present at that frequency and at lower frequencies.

By way of example, if acoustic energy travels at 1500 meters/second in a body of water in which a given marine seismic survey is to be performed, and if FWI is to be the intended use for far offset source energy to be generated during the survey, then it would be useful to limit the far offset shot length to 50 meters for each composite far offset impulsive source activation 1604 generated during the survey. This is because the wavelength of acoustic energy in the body of water at 15 Hz would be 100 meters, and one half wavelength for acoustic energy at that frequency would be 50 meters.

If, on the other hand, AVO analysis is to be the intended use for the far offset source energy, and if frequencies up to 50 Hz are to be used in the AVO analysis, then it would be useful to limit each far offset shot length to 15 meters, as 15 meters would correspond to one half wavelength for acoustic energy in the body of water at 50 Hz.

Composite Far Offset Source Activations as Source Signatures

Figure 20:
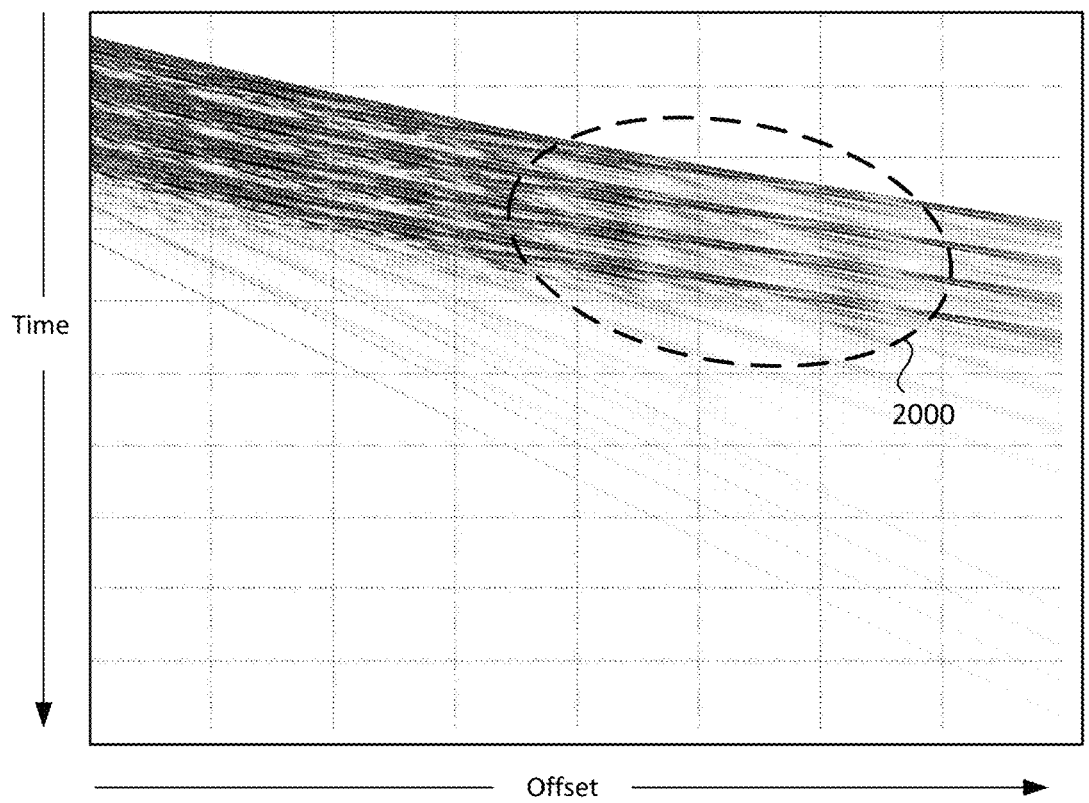
FIG. 20 is a graph illustrating marine seismic traces corresponding to a composite far offset impulsive source activation according to embodiments.

FIG. 20 is a graph showing a collection of traces corresponding to a single composite far offset impulsive source activation 1604, isolated from near offset source energy for the sake of illustration. As can readily be seen in area 2000, the four component impulsive source activations corresponding to a single composite impulsive source activation create four distinct sets of reflections, separated in time by an interval equal to that between the successive component source activations.

In general, this pattern of energy, which corresponds to a succession of component impulsive source activations, creates a unique far offset source signature that is distinct from near offset source signatures such as the one illustrated in FIG. 13. In embodiments that employ FWI, this unique far offset source energy pattern may be used as the signature of the far offset sources so that energy attributable to the far offset sources is distinguishable from energy attributable to the near offset sources. Thus, the unique composite far offset source signature may be used to identify, during FWI, the energy that is associated with the composite far offset impulsive source activations.

Reduced Interference with Near Offset Source Energy

Another benefit of using composite far offset impulsive source activations according to embodiments is a reduction in the amount of interference with near offset source energy that is caused by the far offset source energy. As was explained above, when composite far offset impulsive source activations are employed, the absolute acoustic energy levels emitted by each component impulsive source activation may be reduced relative to the absolute energy level that would be required by a single far offset source activation emitted according to conventional methods. The amplitudes of the far offset energy appearing in the recorded data at near offsets may therefore be commensurately reduced.

Figure 21:
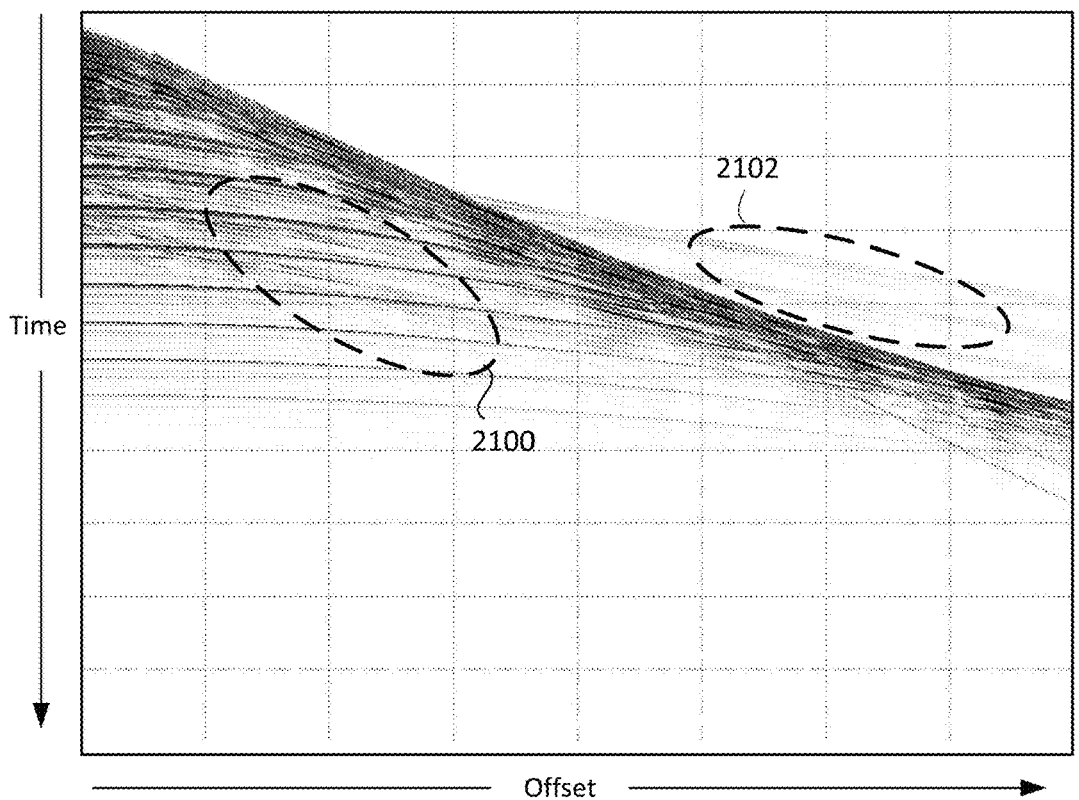
FIG. 21 is a graph illustrating reduced interference in marine seismic traces that results when reflections from a near offset shot according to FIG. 13 are recorded together with reflections from a composite far offset impulsive source activation according to FIG. 21.

FIG. 21 illustrates the benefits of doing so. FIG. 21 is a graph showing a gather of marine seismic traces corresponding to a blend of reflected energy from a single near offset impulsive source activation and a composite far source impulsive source activation according to embodiments. Because the near and far offset energy is blended in FIG. 21, this figure is representative of seismic data as it would ordinarily be collected in the field. Compared with the graph of FIG. 15, the graph of FIG. 21 shows substantially reduced amplitudes for far offset source energy in the areas highlighted at 2100 and 2102. As is apparent from the graph, the composite far offset source activation has caused a reduced amount of interference with the near offset source energy relative to the interference that results from conventional methods.

Because of the reduction in interference, in some embodiments, imaging of near offset data may be conducted without first de-blending the far offset energy from the near offset energy. Thus, in such embodiments, the cost and complexity of processing the seismic data may be reduced while preserving accuracy in the resulting images of the subsurface.

Further Embodiments

A variety of additional embodiments are also possible.

Figure 22:
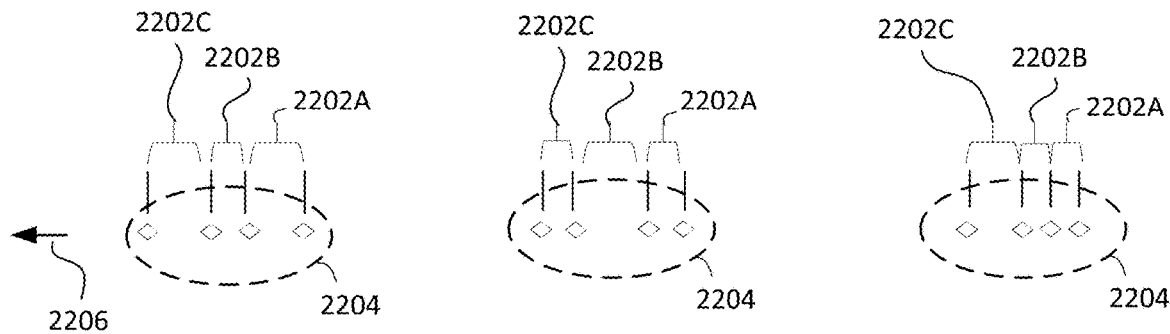
FIGS. 22-24 are top views illustrating example temporally irregular sequences for composite far offset impulsive source activations according to embodiments.
Figure 23:
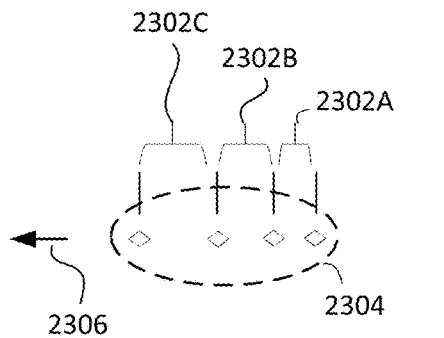
Figure 24:
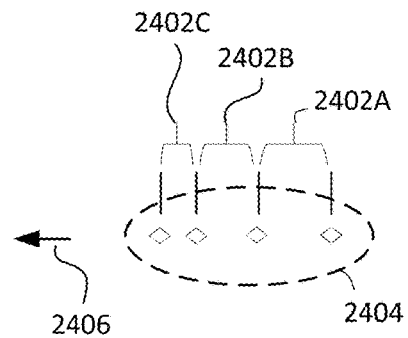

FIGS. 22-24 provide several illustrative examples of embodiments wherein each succession of component impulsive source activations comprises a temporally irregular sequence of impulsive source activations. Such embodiments may be employed to make the source signatures corresponding to far offset energy even more unique relative to the source signatures corresponding to near offset source energy. This enhanced uniqueness in the composite far offset source signatures can be used, for example, during FWI to better distinguish the far offset source energy from other energy that is present in the recorded reflections.

Each of FIGS. 22-24 illustrates one or more example composite far offset source activations. Each such composite far offset source activation may be caused by one or more vessels towing sources or source elements in a tow direction 2206, 2306, 2406. The number of component source activations occurring in each of the illustrated composite source activation is shown only for the sake of illustration. In various embodiments, any or all of the composite source activations may comprise more or fewer component source activations than the ones shown here, consistent with the descriptions provided above.

In the class of embodiments illustrated in FIG. 22, the temporal gaps 2202A, 2202B, 2202C between the component source activations in each composite source activation 2204 comprise a random or a pseudo random sequence. In a "pseudo random" sequence, an arbitrary probability distribution may be imposed on occurrences that otherwise would constitute a "random" sequence absent the imposition of such a distribution.

In the class of embodiments illustrated in FIG. 23, the temporal gaps 2302A, 2302B, 2302C between the component source activations in a composite source activation 2304 change monotonically from smaller (2302A) to larger (2302C) as the succession of activations progresses.

In the class of embodiments illustrated in FIG. 24, the temporal gaps 2402A, 2402B, 2402C between the component source activations in a composite source activation 2404 change monotonically from larger (2402A) to smaller (2402C) as the succession of activations progresses.

Figure 25:
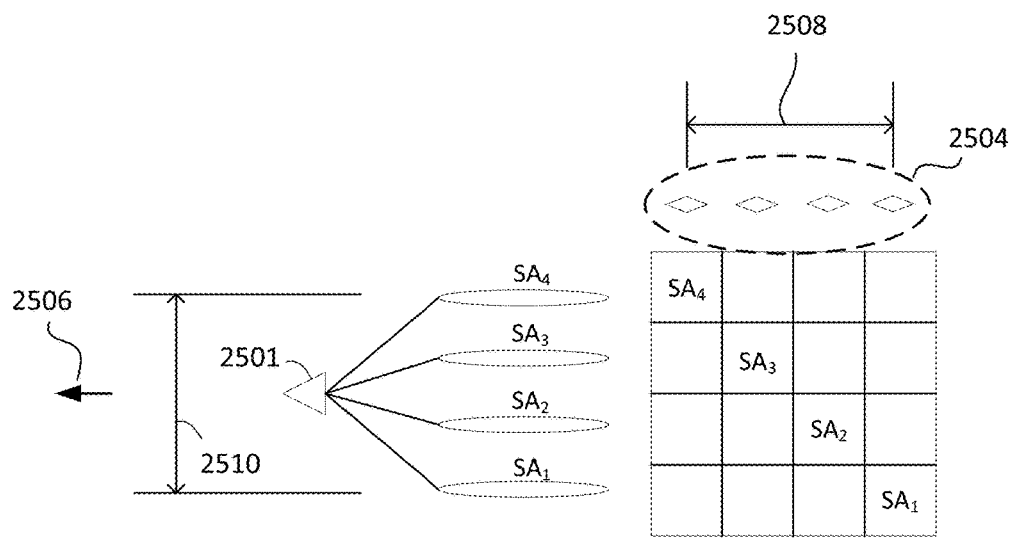
FIG. 25 is a schematic view illustrating an example composite far offset impulsive source activation in which each component source activation corresponds to an activation of one of a plurality of source subarrays, according to embodiments.

FIG. 25 schematically illustrates classes of embodiments in which more than one source, source element, or source subarray may be employed to produce a single composite far offset impulsive source activation. In the illustrated embodiment, four source subarrays $SA_1$, $SA_2$, $SA_3$, $SA_4$ are used to produce a single composite far offset impulsive source activation 2504. In other embodiments, more or fewer sources or source subarrays may be employed, and they may be used to produce composite source activations having a different number of component activations than the one shown. As vessel 2501 sails in tow direction 2506 it causes a succession of component source activations, one subarray at a time, beginning with $SA_1$, followed by $SA_2$, then $SA_3$ and finally $SA_4$ to produce the composite far offset impulsive source activation illustrated at 2504. The succession of component source activations occurs over a far offset shot length 2508 chosen to satisfy a stationary source assumption for frequencies if interest for the corresponding far offset shot point. In embodiments such as the one illustrated, it is useful to also constrain the crossline width 2510 of the source spread such that the crossline width of the source spread does not exceed far offset shot length 2508. Doing so ensures that the above-described Nyquist criterion is satisfied in both the inline and the crossline dimensions at frequencies that are of interest for the far offset shot points.

In other embodiments, multiple subarrays may be towed with inline offsets between them, either with or without crossline offsets. This class of embodiments may be used, if desired, to further reduce the spatial distance between the component source activations corresponding to a single composite source activation. By way of example, if plural subarrays were to be towed with inline offsets of 5 meters, and the towing vessel were to steam at a speed of 4.8 knots, then activating the plural subarrays in succession with a 2 second delay between each activation would result in all of the component source activations happening in exactly the same location for a given composite source activation (e.g., for a given far offset shot point). Other similar examples are also possible, including those for which the far offset shot length is reduced by this technique but remains non-zero).

If it is desired to produce more component source activations than the number of far offset subarrays in the source spread, one or more of the subarrays may be activated twice during a single composite source activation, allowing time as appropriate for recharging air guns in the subject subarray.

Yet another class of embodiments is illustrated by way of example in FIG. 26. In this class of embodiments, a near offset vessel tows a near offset source while a far offset vessel tows a far offset source. Activations of the near offset source are shown in the drawing as stars. Activations of the far offset source are shown as diamonds. The near offset vessel may sail at speed 1 throughout the survey, while the far offset vessel may sail at different speeds at various times, as shown. Doing so may facilitate generating composite far offset impulsive source activations that each have a suitably short far offset shot length. For example, speed 2 may be greater than speed 1, but speed 3 may be slower than speed 2 in order to accommodate both the far offset shot length constraint as well as the charging and/or recharging times that may be required for the air guns that are used to produce the component impulsive source activations.

Example Methods

Figure 27:
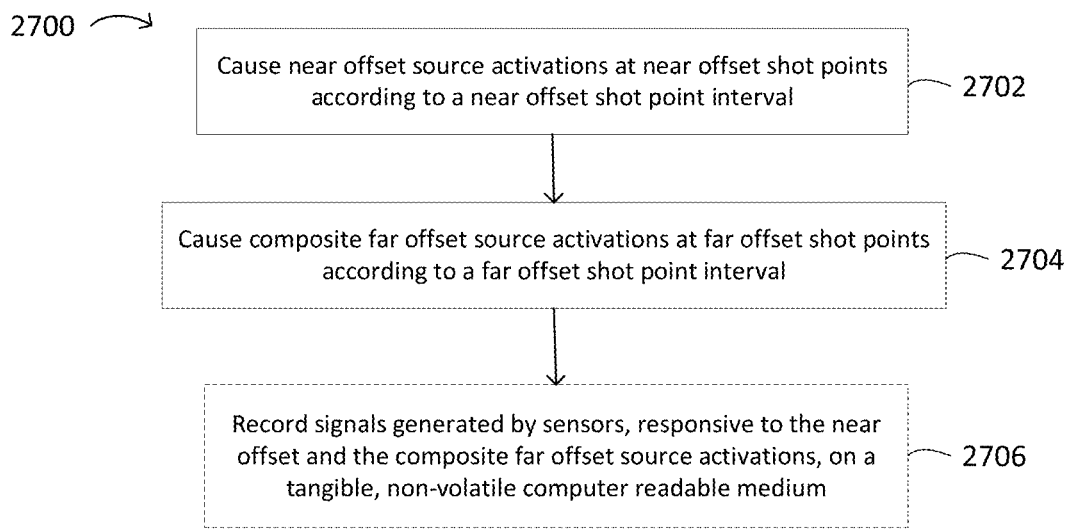
FIG. 27 is a flow diagram illustrating an example class of methods for performing marine seismic surveys and for manufacturing a geophysical data product, according to embodiments.
Figure 28:
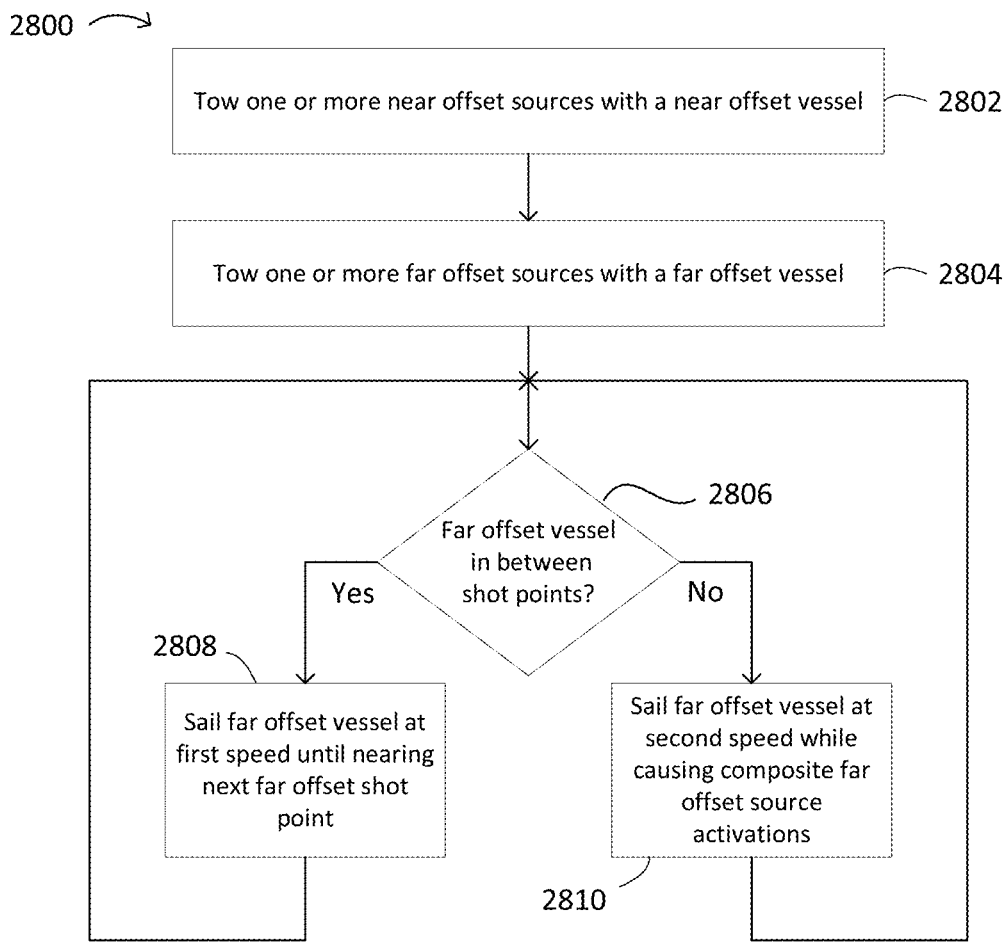
FIG. 28 is a flow diagram illustrating an example class of methods corresponding to the technique of FIG. 26, according to embodiments.
Figure 29:
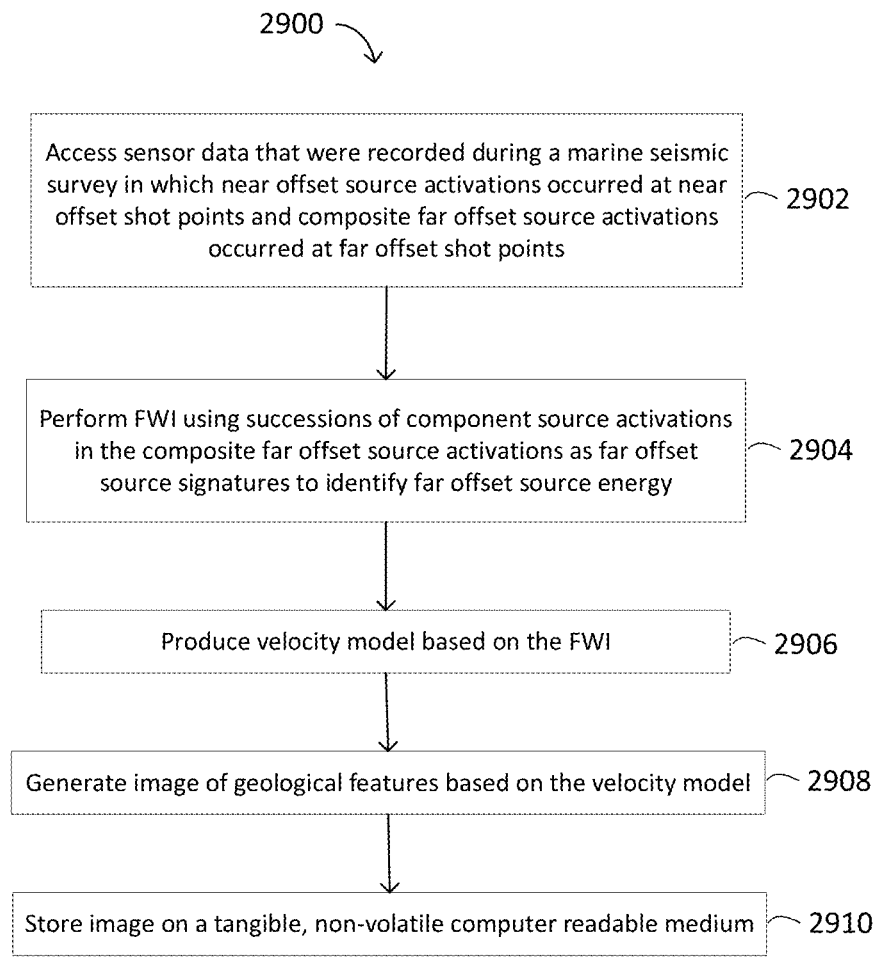
FIG. 29 is a flow diagram illustrating an example class of methods for generating an image of a geological feature within a subsurface, according to embodiments.

FIGS. 27-29 illustrates several example classes of methods in which the above-described techniques may be employed.

Referring now to FIG. 27, a method 2700 for performing a marine seismic survey may comprise causing, at step 2702, near offset source activations at near offset shot points according to a near offset shot point interval and causing, at step 2704, composite far offset source activations at far offset shot points according to a far offset shot point interval. The composite far offset impulsive source activations may be generated according to any of the techniques described above. If desired, a geophysical data product may be manufactured in conjunction with performing steps 2702 and 2704 by recording, as indicated at step 2706, signals generated by sensors responsive to the source activations on a tangible, non-volatile computer readable medium.

FIG. 28 illustrates a method 2800 for performing a marine seismic survey in accordance with the technique described above in relation to FIG. 26. Method 2800 may be performed in conjunction with any of methods 2700 or may be performed independently. The method comprises towing, at step 2802, one or more near offset sources with a near offset vessel and towing, at step 2804, one or more far offset sources with a far offset vessel. As indicated at step 2806, the far offset vessel sails at first and second speeds depending on whether the vessel is transiting between two far offset shot points, in which case the vessel travels at the first speed, or whether the vessel is instead causing a composite far offset impulsive source activation, in which case the vessel travels at the second speed. In some embodiments, the second speed is slower than the first speed. The second speed may be chosen to facilitate generating all of the requisite component source activations within a distance that does not exceed the far offset shot length for a corresponding composite far offset impulsive source activation. The first speed may be faster than the second speed in order to enable the far offset vessel to keep pace with the near offset vessel. In some embodiments, the second speed may be slower than the speed at which the near offset vessel sails, and the first speed may be faster than the speed at which the near offset vessel sails.

FIG. 29 illustrates an example method 2900 for generating an image of geological features disposed within a subsurface under a body of water in accordance with the techniques described above. At step 2902, a computer system may be used to access data that were recorded during a marine seismic survey in which near offset source activations occurred at near offset shot points and composite far offset source activations occurred at far offset shot points. Method 2900 need not include actually performing the survey. In some circumstances, method 2900 may be performed by a data processing entity after the sensor data have been acquired by another entity. In other circumstances, method 2900 may be performed by the same entity that performed the marine seismic survey to acquire the sensor data.

At step 2902, an FWI process may be performed. The FWI process may be performed according to known techniques, except that in method 2900 the FWI process uses the successions of component source activations in respective composite far offset source activations as far offset source signatures to identify far offset source energy during the FWI process. At step 2906, a velocity model is produced based at least in part on results from the FWI process. At step 2908, an image of geological features in the subsurface may be generated based at least in part on the velocity model. At step 2910, the image or data representative thereof may be stored on a tangible, computer-readable storage medium.

Computer System

Figure 30:
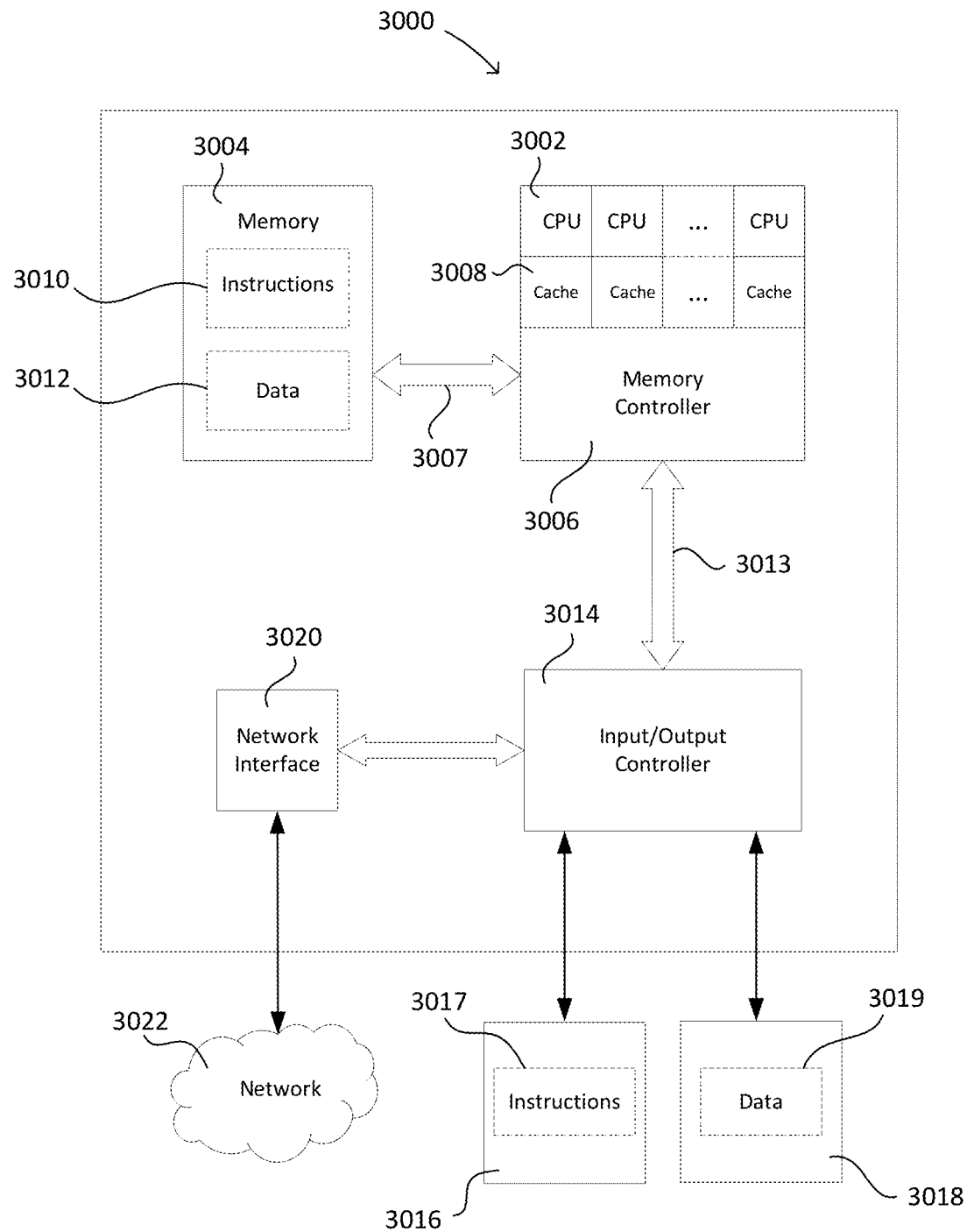
FIG. 30 is a block diagram schematically illustrating an example computing device suitable for use in connection with embodiments.

FIG. 30 is a block diagram illustrating an example computer system 3000 that may be used to implement any of the methods described above. A computer system such as computer system 3000 may also be used to produce a computer-readable survey plan that, if followed by navigation and control equipment onboard a survey vessel, causes the vessel to perform any of the methods described above.

Computer system 3000 includes one or more central processor unit ("CPU") cores 3002 coupled to a system memory 3004 by a high-speed memory controller 3006 and an associated high-speed memory bus 3007. System memory 3004 typically comprises a large array of random-access memory locations, often housed in multiple dynamic random-access memory ("DRAM") devices, which in turn are housed in one or more dual inline memory module ("DIMM") packages. Each CPU core 3002 is associated with one or more levels of high-speed cache memory 3008, as shown. Each core 3002 can execute computer-readable instructions 3010 stored in system memory 3004, and can thereby perform operations on data 3012, also stored in system memory 3004.

Memory controller 3006 is coupled, via input/output bus 3013, to one or more input/output controllers such as input/output controller 3014. Input/output controller 3014 is in turn coupled to one or more tangible, non-volatile, computer readable media such as computer-readable medium 3016 and computer-readable medium 3018. Non-limiting examples of such computer-readable media include so-called solid-state disks ("SSDs"), spinning-media magnetic disks, optical disks, flash drives, magnetic tape, and the like. Media 3016, 3018 may be permanently attached to computer system 3000 or may be removable and portable. In the example shown, medium 3016 has instructions 3017 (software) stored therein, while medium 3018 has data 3019 stored therein. Operating system software executing on computer system 3000 may be employed to enable a variety of functions, including transfer of instructions 3010, 3017 and data 3012, 3019 back and forth between media 3016, 3018 and system memory 3004.

Computer system 3000 may represent a single, stand-alone computer workstation that is coupled to input/output devices such as a keyboard, pointing device and display. It may also represent one node in a larger, multi-node or multi-computer system such as a cluster, in which case access to its computing capabilities may be provided by software that interacts with and/or controls the cluster. Nodes in such a cluster may be collocated in a single data center or may be distributed across multiple locations or data centers in distinct geographic regions. Further still, computer system 3000 may represent an access point from which such a cluster or multi-computer system may be accessed and/or controlled. Any of these or their components or variants may be referred to herein as "computing apparatus," a "computing device," or a "computer system."

In example embodiments, data 3019 may correspond to sensor measurements or other data recorded during a marine geophysical survey or may correspond to a survey plan for implementing any of the methods described herein. Instructions 3017 may correspond to algorithms for performing any of the methods described herein, or for producing a computer-readable survey plan for implementing one or more of such methods. In such embodiments, instructions 3017, when executed by one or more computing devices such as one or more of CPU cores 3002, cause the computing device to perform operations described herein on the data, producing results that may be stored in one or more tangible, non-volatile, computer-readable media such as medium 3018. In such embodiments, medium 3018 constitutes a geophysical data product that is manufactured by, for example, using the computing device to perform methods described herein and by storing the results in the medium. Geophysical data product 3018 may be stored locally or may be transported to other locations where further processing and analysis of its contents may be performed. If desired, a computer system such as computer system 3000 may be employed to transmit the geophysical data product electronically to other locations via a network interface 3020 and a network 3022 (e.g. the Internet). Upon receipt of the transmission, another geophysical data product may be manufactured at the receiving location by storing contents of the transmission, or processed versions thereof, in another tangible, non-volatile, computer readable medium. Similarly, geophysical data product 3018 may be manufactured by using a local computer system 3000 to access one or more remotely-located computing devices in order to execute instructions 3017 remotely, and then to store results from the computations on a medium 3018 that is attached either to the local computer or to one of the remote computers. The word "medium" as used herein should be construed to include one or more of such media.

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions or locations, and some components may be omitted, while other components may be added, except where the context clearly indicates otherwise. The scope of the disclosure is intended to include all such combinations, modifications, and generalizations as well as their equivalents.

What is claimed is:

1. A method of performing a marine seismic survey in a body of water over a subsurface, comprising:
    causing near offset impulsive source activations in the body of water at each of a plurality of near offset shot points according to a near offset shot point interval;
    causing composite far offset impulsive source activations in the body of water at each of a plurality of far offset shot points according to a far offset shot point interval, wherein each of the composite far offset impulsive source activations comprises a succession of component impulsive source activations occurring over a far offset shot length, and wherein the far offset shot length is not greater than one half wavelength for acoustic energy in the body of water at a maximum frequency of interest for the far offset shot points; and
    recording signals, or representations thereof, generated by plural sensors or sensor groups responsive to the near offset impulsive source activations and the composite far offset impulsive source activations;
    wherein the phrases "near offset" and "far offset" mean that, for any given one of the plural sensors or sensor groups, a distance between the far offset shot points and the given sensor or sensor group is larger than a corresponding distance between the near offset shot points and the given sensor or sensor group.

2. The method of claim 1, wherein:
the maximum frequency of interest for the far offset shot points corresponds to a maximum frequency of interest for purposes of full waveform inversion.

3. The method of claim 2, wherein:
the maximum frequency of interest for the far offset shot points is 15 Hz.

4. The method of claim 1, wherein:
the maximum frequency of interest for the far offset shot points corresponds to a maximum frequency of interest for purposes of amplitude versus offset analysis.

5. The method of claim 4, wherein:
the maximum frequency of interest for the far offset shot points is 50 Hz.

6. The method of claim 1, wherein:
a largest near offset corresponding to the near offset impulsive source activations is smaller than a smallest far offset corresponding to the composite far offset impulsive source activations.

7. The method of claim 1, wherein:
at least one of the component impulsive source activations in at least one of the successions generates insufficient energy to meet a signal energy requirement at a point of interest in the subsurface; and
a combined energy of all of the component impulsive source activations in the at least one succession equals or exceeds the signal energy requirement at the point of interest.

8. The method of claim 1, wherein:
each of the component impulsive source activations generates energy at or below an environmental energy limit.

9. The method of claim 8, wherein:
a single component impulsive source activation at or below the environmental energy limit would be insufficient to meet a signal energy requirement at a point of interest in the subsurface; and
a combined energy of all of the component impulsive source activations in a given succession equals or exceeds the signal energy requirement at the point of interest.

10. The method of claim 1, wherein:
the far offset shot point interval is longer than the near offset shot point interval.

11. The method of claim 1, wherein:
at least one of the successions of component impulsive source activations comprises a temporally irregular sequence of source activations.

12. The method of claim 11, wherein:
the temporally irregular sequence comprises a random or a pseudo random sequence.

13. The method of claim 11, wherein:
temporal gaps between the source activations in the sequence change monotonically from larger to smaller or from smaller to larger.

14. The method of claim 1, further comprising:
towing one or more near offset impulsive sources with a near offset vessel and towing one or more far offset sources with a far offset vessel;
sailing the far offset vessel at a first speed when the far offset vessel is in between far offset shot points; and
sailing the far offset vessel at a second speed, different than the first speed, when the far offset vessel is causing the composite far offset impulsive source activations.

15. The method of claim 14:
wherein the second speed is slower than the first speed.

16. The method of claim 1, further comprising:
towing at least first and second far offset impulsive source subarrays; and
wherein at least a first one of the component impulsive source activations corresponds to an activation of the first subarray, and at least a second one of the component impulsive source activations corresponds to an activation of the second subarray.

17. The method of claim 1:
wherein the succession of component impulsive source activations in at least one of the composite far offset impulsive source activations creates a far offset source signature; and
further comprising using the far offset source signature to identify, during a full waveform inversion procedure, energy associated with the at least one composite far offset impulsive source activation.

18. The method of claim 1:
wherein the succession of component impulsive source activations in at least one of the composite far offset impulsive source activations creates a far offset source signature; and
further comprising using the far offset source signature to distinguish far offset shot energy from near offset shot energy.

19. A tangible non-volatile computer readable medium having instructions or data stored therein that, when executed or used by navigation and control equipment onboard one or more marine seismic survey vessels, cause the one or more vessels to perform a method comprising:
causing near offset impulsive source activations in the body of water at each of a plurality of near offset shot points according to a near offset shot point interval;
causing composite far offset impulsive source activations in the body of water at each of a plurality of far offset shot points according to a far offset shot point interval, wherein each of the composite far offset impulsive source activations comprises a succession of component impulsive source activations occurring over a far offset shot length, and wherein the far offset shot length is not greater than one half wavelength for acoustic energy in the body of water at a maximum frequency of interest for the far offset shot points; and
recording signals, or representations thereof, generated by sensors responsive to the near offset impulsive source activations and the composite far offset impulsive source activations;
wherein the phrases "near offset" and "far offset" mean that, for any given one of the plural sensors or sensor groups, a distance between the far offset shot points and the given sensor or sensor group is larger than a corresponding distance between the near offset shot points and the given sensor or sensor group.

20. The method of claim 19, wherein:
the maximum frequency of interest for the far offset shot points corresponds to a maximum frequency of interest for purposes of full waveform inversion.

21. The medium of claim 19, wherein:
the far offset shot point interval is longer than the near offset shot point interval.

22. The medium of claim 19, wherein:
at least one of the successions of component impulsive source activations comprises a temporally irregular sequence of source activations.

23. The medium of claim 19, wherein the method further comprises:

towing one or more near offset impulsive sources with a near offset vessel and towing one or more far offset sources with a far offset vessel;

sailing the far offset vessel at a first speed when the far offset vessel is in between far offset shot points; and sailing the far offset vessel at a second speed, slower than the first speed, when the far offset vessel is causing the composite far offset impulsive source activations.

24. The medium of claim 19, wherein the method further comprises:

towing two or more far offset impulsive source subarrays; and wherein each component impulsive source activation corresponds to an activation of one of the two or more far offset impulsive source subarrays.

25. A method of manufacturing a geophysical data product, comprising:

causing near offset impulsive source activations in the body of water at each of a plurality of near offset shot points according to a near offset shot point interval; and causing composite far offset impulsive source activations in the body of water at each of a plurality of far offset shot points according to a far offset shot point interval, wherein each of the composite far offset impulsive source activations comprises a succession of component impulsive source activations occurring over a far offset shot length, and wherein the far offset shot length is not greater than one half wavelength for acoustic energy in the body of water at a maximum frequency of interest for the far offset shot points; and recording, on a tangible non-volatile computer-readable medium, signals, or representations thereof, generated by plural sensors or sensor groups responsive to the near offset impulsive source activations and the composite far offset impulsive source activations, thereby completing the manufacture of the geophysical data product;

wherein the phrases "near offset" and "far offset" mean that, for any given one of the plural sensors or sensor groups, a distance between the far offset shot points and the given sensor or sensor group is larger than a corresponding distance between the near offset shot points and the given sensor or sensor group.

26. A method of generating an image of geological features disposed within a subsurface under a body of water, comprising:

accessing sensor data that were recorded from plural sensors or sensor groups during a marine seismic survey in which near offset impulsive source activations were caused in the body of water at each of a plurality of near offset shot points according to a near offset shot point interval, and composite far offset impulsive source activations were caused in the body of water at each of a plurality of far offset shot points according to a far offset shot point interval, wherein each of the composite far offset impulsive source activations comprised a succession of component impulsive source activations occurring over a far offset shot length, and wherein the far offset shot length is not greater than one half wavelength for acoustic energy in the body of water at a maximum frequency of interest for the far offset shot points;

performing, using a computing device, a full waveform inversion procedure, wherein the full waveform inversion procedure uses each of the successions of component impulsive source activations as respective far offset source signatures to identify far offset source energy;

producing, using the computing device, a velocity model based on the full waveform inversion procedure;

generating, using the computing device, the image of the geological features based on the velocity model; and storing the image or a representation thereof in one or more tangible, non-volatile, computer readable storage media;

wherein the phrases "near offset" and "far offset" mean that, for any given one of the plural sensors or sensor groups, a distance between the far offset shot points and the given sensor or sensor group is larger than a corresponding distance between the near offset shot points and the given sensor or sensor group.

27. The method of claim 26, further comprising performing the marine seismic survey and recording the sensor data.

* * * * *